US010483023B1

(12) United States Patent
Itani

(10) Patent No.: US 10,483,023 B1
(45) Date of Patent: Nov. 19, 2019

(54) RESISTOR CALIBRATION

(71) Applicant: Futurewei Technologies, Inc., Plano, TX (US)

(72) Inventor: Nadi Itani, Arvada, CO (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/016,117

(22) Filed: Jun. 22, 2018

(51) Int. Cl.
*H01C 10/16* (2006.01)
*H04B 1/3827* (2015.01)
*G05F 1/46* (2006.01)

(52) U.S. Cl.
CPC .............. *H01C 10/16* (2013.01); *G05F 1/46* (2013.01); *H04B 1/3827* (2013.01)

(58) Field of Classification Search
CPC .......... H02M 2001/0058; H02M 1/08; H02M 1/088; H02M 2001/0054; H02M 2001/123; H03K 17/04123; H03K 17/162; H03K 17/168; H03K 17/687; H03K 5/003; H03K 5/007; H03K 5/24; H03F 2200/375; H03F 3/70; H03F 3/45968; H03F 3/45973
See application file for complete search history.

(56) References Cited

U.S. PATENT DOCUMENTS

| 8,451,021 | B1 | 5/2013 | Fox et al. |
| 8,581,667 | B2 | 11/2013 | Navubothu et al. |
| 8,922,266 | B2 * | 12/2014 | Ikeda ................... H03K 17/145 327/344 |
| 9,160,356 | B1 | 10/2015 | Kearney et al. |

FOREIGN PATENT DOCUMENTS

CN          105281766 A       1/2016

OTHER PUBLICATIONS

International Search Report dated Jun. 24, 2019, in PCT Application No. PCT/CN2019/079195, 9 pages.

* cited by examiner

*Primary Examiner* — Hai L Nguyen
(74) *Attorney, Agent, or Firm* — Vierra Magen Marcus LLP

(57) ABSTRACT

An electrical circuit includes a configurable resistor and a reference resistor with a current source circuit coupled to provide a current to the configurable resistor and the reference resistor. An Analog-to-Digital Converter (ADC) is configured to convert voltages from the configurable resistor and the reference resistor to digital values. A calculation circuit is configured to calculate an adjustment for the configurable resistor from a digital reference value obtained from a reference resistor voltage and two or more digital values obtained from two or more voltages corresponding to two or more configurations of the configurable resistor. A sequencer adjusts the configurable resistor based on the adjustment calculated by the calculation circuit.

20 Claims, 14 Drawing Sheets

| Resistive Element | R1 | R2 | R3 | R4 | R5 |
|---|---|---|---|---|---|
| Bit | b4 | b3 | b2 | b1 | b0 |
| Resistance | 16Rlsb | 8Rlsb | 4Rlsb | 2Rlsb | Rlsb |

RESISTOR CALIBRATION

FIELD

The disclosure generally relates to electrical circuits including integrated circuits used in communications.

BACKGROUND

Electronic circuits, including electronic circuits formed as integrated circuits on semiconductor substrates, include various active and passive components. Passive components may include resistors designed to have different resistances in different circuits according to their function. In some cases, a resistor may have a resistance that is different from its designed resistance, e.g. because of process variations across a semiconductor substrate, from substrate to substrate, or other effects. Different circuits may have different ranges for acceptable resistances and in some cases process related variation may impact circuit performance. It is desirable, therefore, to provide a circuit that overcomes or reduces the impact of such process variations.

BRIEF SUMMARY

According to one aspect of the present disclosure, there is provided an electrical circuit, comprising a configurable resistor; a reference resistor; a current source circuit coupled to provide a current to the configurable resistor and the reference resistor; an Analog-to-Digital Converter (ADC) coupled to the configurable resistor and the reference resistor, the ADC configured to convert voltages from the configurable resistor and the reference resistor to digital values; a calculation circuit coupled to receive digital values from the ADC, the calculation circuit configured to calculate an adjustment for the configurable resistor from a digital reference value obtained from a reference resistor voltage and two or more digital values obtained from two or more voltages corresponding to two or more configurations of the configurable resistor; and a sequencer configured to adjust the configurable resistor based on the adjustment calculated by the calculation circuit.

Optionally, in any of the preceding aspects, the two or more digital values include a first digital value obtained from conversion of a first voltage from the configurable resistor in a first configuration, a second digital value obtained from conversion of a second voltage from the configurable resistor in a second configuration.

Optionally, in any of the preceding aspects, the configurable resistor is configurable to have a set of discrete resistance values configurable by a set of configuration codes, each discrete resistance value based on a corresponding configuration code, the first configuration corresponding to a first configuration code, the second configuration corresponding to a second configuration code, and a target configuration corresponding to a target configuration code, the calculation circuit configured to calculate the target configuration code for the configurable resistor and the sequencer configured to adjust the configurable resistor by sending the target configuration to the configurable resistor.

Optionally, in any of the preceding aspects, the set of discrete resistance values are stepped values with each discrete resistance value differing from adjacent discrete resistance values by a step and wherein the calculation circuit is configured to calculate a step voltage from a difference between the first digital value and the second digital value divided by a number of configurations between the first configuration and the second configuration.

Optionally, in any of the preceding aspects, the calculation circuit is configured to calculate a first difference between the first digital value and the digital reference value divided by the step voltage.

Optionally, in any of the preceding aspects, the calculation circuit is configured to calculate a second difference between the second digital value and the digital reference value divided by the step voltage and to select a smaller one of the first or second differences to obtain the target configuration code.

Optionally, in any of the preceding aspects, the current source circuit includes a current mirror, a first leg of the current mirror coupled to the reference resistor and a second leg of the current mirror coupled to the configurable resistor.

Optionally, in any of the preceding aspects, the current mirror includes a third leg coupled to a current output.

Optionally, in any of the preceding aspects, further comprising a first switch between the first leg of the current mirror and the reference resistor, a second switch between the third leg and the current output, and a third switch between the first leg and the current output, configurable to connect the current output to either the first leg or the third leg of the current mirror.

Optionally, in any of the preceding aspects, the current source circuit further includes an operational amplifier having an output controlling the first leg, second leg, and third leg of the current mirror, an input of the operational amplifier coupled to the first leg and the second leg of the current mirror.

According to one other aspect of the present disclosure, there is provided a method of calibrating a configurable resistor comprising: generating a reference voltage from an electrical current applied to a reference resistor having a target resistance; converting the reference voltage to a digital reference value; generating a first voltage from the electrical current applied to the configurable resistor while the configurable resistor is in a first configuration generated by a first configuration code; converting the first voltage to a first digital value; generating a second voltage from the electrical current applied to the configurable resistor while the configurable resistor is in a second configuration generated by a second configuration code to generate a second voltage; converting the second voltage to a second digital value; calculating from the digital reference value, the first digital value, and the second digital value, a target configuration code corresponding to the target resistance; and configuring the configurable resistor by providing the target configuration code to the configurable resistor.

Optionally, in any of the preceding aspects, calculating the target configuration code includes calculating a step voltage, the step voltage calculated from a difference between the first digital value and the second digital value divided by a number of configurations from the first configuration to the second configuration.

Optionally, in any of the preceding aspects, calculating the target configuration code includes calculating a difference between the first digital value and the digital reference value divided by the step voltage to obtain a first offset from the first configuration code.

Optionally, in any of the preceding aspects, calculating the target configuration code further comprises calculating a difference between the second digital value and the digital reference value divided by the step voltage to obtain a second offset from the second configuration code, the target configuration code calculated from the smaller of the first offset from the first configuration code and the second offset from the second configuration code.

Optionally, in any of the preceding aspects, the method further comprises providing the electrical current to the configurable resistor while the configurable resistor is in an additional one or more configurations generated by an additional one or more configuration codes to generate an additional one or more voltages; converting the additional one or more voltages to an additional one or more digital values; calculating differences between the additional one or more digital values and the digital reference value divided by the step voltage to obtain an additional one or more offsets from the additional one or more configuration codes; and calculating the target configuration code using the smaller of the first offset from the first configuration code, the second offset from the second configuration code, and the additional one or more offsets from the additional one or more configuration codes.

Optionally, in any of the preceding aspects, providing the electrical current to the reference resistor and providing the electrical current to the configurable resistor includes configuring a current mirror to mirror the electrical current to the reference resistor and the configurable resistor, and further includes mirroring the electrical current to a current output.

Optionally, in any of the preceding aspects, the digital reference value, the first digital value, and the second digital value are obtained in a predetermined sequence and calculating the target configuration code occurs after completion of the predetermined sequence.

According to still one other aspect of the present disclosure, there is provided a resistance calibration circuit, comprising: a configurable resistor configurable by a digital configuration code to have a configuration from a set of configurations corresponding to a set of stepped resistance values; a reference resistor of a predetermined resistance; a current mirror coupled to provide a mirrored current to a first terminal of the configurable resistor and to a first terminal of the reference resistor, a second terminal of the configurable resistor and a second terminal of the reference resistor connected to ground; an Analog-to-Digital Converter (ADC) coupled to the configurable resistor and the reference resistor, the ADC configured to convert a first voltage from the first terminal of the configurable resistor in a first configuration to a first digital value, convert a second voltage from the first terminal of the configurable resistor in a second configuration to a second digital value, and convert a voltage at the first terminal of the reference resistor to a digital reference value; a calculation circuit configured to calculate a difference between the first digital value and the second digital value divided by a number of configurations from the first configuration to the second configuration to obtain a step voltage, divide the difference between at least one of the first or second digital values and the digital reference value by the step voltage to obtain an offset, and generate a target code by applying the offset to the first or second digital value; and a sequencer to configure the configurable resistor according to the target code to have a resistance corresponding to the predetermined resistance.

Optionally, in any of the preceding aspects, there is provided a plurality of switches and wherein the sequencer is further coupled to control the plurality of switches to configure the current mirror in a plurality of configurations including at least a calibration configuration and an operational configuration.

Optionally, in any of the preceding aspects, the digital configuration code is an n digit code, the configurable resistor has a configuration range that includes 2n configurations, and the first configuration and second configuration are equally spaced from a mid-point of the configuration range at 2n/4 above and below the mid-point of the configuration range respectively.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

Figure 1:
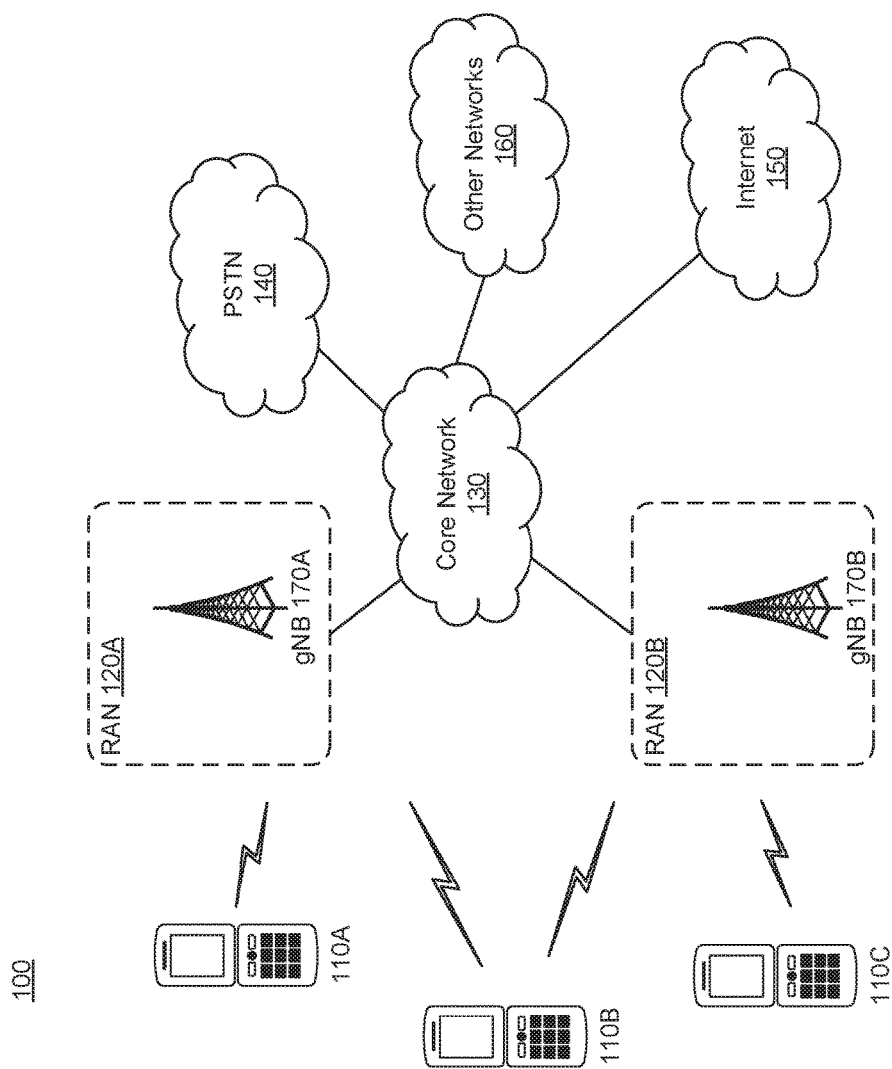
FIG. 1 illustrates an exemplary wireless network for communicating data.

The present disclosure will now be described with reference to the figures, which in general relate to configurable resistors used in integrated circuits and to systems and methods for calibrating such configurable resistors.

Resistors are used in many electrical circuits including integrated circuits formed in or on semiconductor substrates. Forming resistors with precise uniform resistances by semiconductor fabrication techniques is challenging. In some cases, variation may be in the range of +/−15% to 20%, or more. This makes manufacture of resistors with an accurate resistance problematic in many situations.

A configurable resistor may be configured to have a desired resistance and thus overcome variation caused by processing or other effects. In order to configure a resistor to a desired resistance, a calibration process may use a reference resistor (e.g. an external resistor such as a discrete component that is not subject to process variation or is less subject to process variation). The reference resistor and configurable resistor may be connected to a current source circuit (e.g. a current mirror with feedback loop) so that they receive the same current. Voltages may be sampled by an Analog-to-Digital Converter (ADC) connected to the reference resistor and the configurable resistor. Two or more samples may be taken from the configurable resistor in two or more configurations (e.g. configurations providing resistances that are widely spaced and span a large portion of the resistance range of the configurable resistor). The samples are in the form of digital values. A step voltage is calculated from the difference between these digital values divided by the number of steps between them (i.e. the number of different configurations with corresponding steps in resistance and voltage). A reference sample is taken from the reference resistor to give a digital reference value. The voltage between the digital reference value and a digital value from one of the configurations (e.g. the configuration providing a digital value closest to the digital reference value) is divided by the step voltage to determine the number of steps (number of configurations) from that configuration to a target configuration (i.e. to a configuration of the configurable resistor that gives a resistance at or near the resistance of the reference resistor). The configurable resistor is then configured to have the target configuration (e.g. by setting a configuration code to a target configuration code).

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

FIG. 1 illustrates a wireless network for communicating data. The communication system 100 includes, for example, user equipment 110A-110C, radio access networks (RANs) 120A-120B, a core network 130, a public switched telephone network (PSTN) 140, the Internet 150, and other networks 160. Additional or alternative networks include private and public data-packet networks including corporate intranets. While certain numbers of these components or elements are shown in the figure, any number of these components or elements may be included in the system 100.

In one embodiment, the wireless network may be a fifth generation (5G) network including at least one 5G base station which employs orthogonal frequency-division multiplexing (OFDM) and/or non-OFDM and a transmission time interval (TTI) shorter than 1 ms (e.g. 100 or 200 microseconds), to communicate with the communication devices. In general, a base station may also be used to refer any of the eNB and the 5G BS (gNB). In addition, the network may further include a network server for processing information received from the communication devices via the at least one eNB or gNB.

System 100 enables multiple wireless users to transmit and receive data and other content. The system 100 may implement one or more channel access methods, such as but not limited to code division multiple access (CDMA), time division multiple access (TDMA), frequency division multiple access (FDMA), orthogonal FDMA (OFDMA), or single-carrier FDMA (SC-FDMA).

The user equipment (UE) 110A-110C are configured to operate and/or communicate in the system 100. For example, the user equipment 110A-110C are configured to transmit and/or receive wireless signals or wired signals. Each user equipment 110A-110C represents any suitable end user device and may include such devices (or may be referred to) as a user equipment/device, wireless transmit/receive unit (UE), mobile station, fixed or mobile subscriber unit, pager, cellular telephone, personal digital assistant (PDA), smartphone, laptop, computer, touchpad, wireless sensor, wearable devices or consumer electronics device.

In the depicted embodiment, the RANs 120A-120B include one or more base stations 170A, 170B (collectively, base stations 170), respectively. Each of the base stations 170 is configured to wirelessly interface with one or more of the UEs 110A, 110B, 110C to enable access to the core network 130, the PSTN 140, the Internet 150, and/or the other networks 160. For example, the base stations (BSs) 170 may include one or more of several well-known devices, such as a base transceiver station (BTS), a Node-B (NodeB), an evolved NodeB (eNB), a next (fifth) generation (5G) NodeB (gNB), a Home NodeB, a Home eNodeB, a site controller, an access point (AP), or a wireless router, or a server, router, switch, or other processing entity with a wired or wireless network.

In one embodiment, the base station 170A forms part of the RAN 120A, which may include other base stations, elements, and/or devices. Similarly, the base station 170B forms part of the RAN 120B, which may include other base stations, elements, and/or devices. Each of the base stations 170 operates to transmit and/or receive wireless signals within a particular geographic region or area, sometimes referred to as a "cell." In some embodiments, multiple-input multiple-output (MIMO) technology may be employed having multiple transceivers for each cell.

The base stations 170 communicate with one or more of the user equipment 110A-110C over one or more air interfaces (not shown) using wireless communication links. The air interfaces may utilize any suitable radio access technology.

It is contemplated that the system 100 may use multiple channel access functionality, including for example schemes in which the base stations 170 and user equipment 110A-110C are configured to implement the Long Term Evolution wireless communication standard (LTE), LTE Advanced (LTE-A), and/or LTE Multimedia Broadcast Multicast Service (MBMS). In other embodiments, the base stations 170 and user equipment 110A-110C are configured to implement UMTS, HSPA, or HSPA+ standards and protocols. Of course, other multiple access schemes and wireless protocols may be utilized.

The RANs 120A-120B are in communication with the core network 130 to provide the user equipment 110A-110C with voice, data, application, Voice over Internet Protocol (VoIP), or other services. As appreciated, the RANs 120A-

120B and/or the core network 130 may be in direct or indirect communication with one or more other RANs (not shown). The core network 130 may also serve as a gateway access for other networks (such as PSTN 140, Internet 150, and other networks 160). In addition, some or all of the user equipment 110A-110C may include functionality for communicating with different wireless networks over different wireless links using different wireless technologies and/or protocols.

The RANs 120A-120B may also include millimeter and/or microwave access points (APs). The APs may be part of the base stations 170 or may be located remote from the base stations 170. The APs may include, but are not limited to, a connection point (an mmW CP) or a base station 170 capable of mmW communication (e.g., a mmW base station). The mmW APs may transmit and receive signals in a frequency range, for example, from 24 GHz to 100 GHz, but are not required to operate throughout this range. As used herein, the term base station is used to refer to a base station and/or a wireless access point.

Although FIG. 1 illustrates one example of a communication system, various changes may be made to FIG. 1. For example, the communication system 100 could include any number of user equipment, base stations, networks, or other components in any suitable configuration. It is also appreciated that the term user equipment may refer to any type of wireless device communicating with a radio network node in a cellular or mobile communication system. Non-limiting examples of user equipment are a target device, device-to-device (D2D) user equipment, machine type user equipment or user equipment capable of machine-to-machine (M2M) communication, laptops, PDA, iPad, Tablet, mobile terminals, smart phones, laptop embedded equipped (LEE), laptop mounted equipment (LME) and USB dongles.

Figure 2:
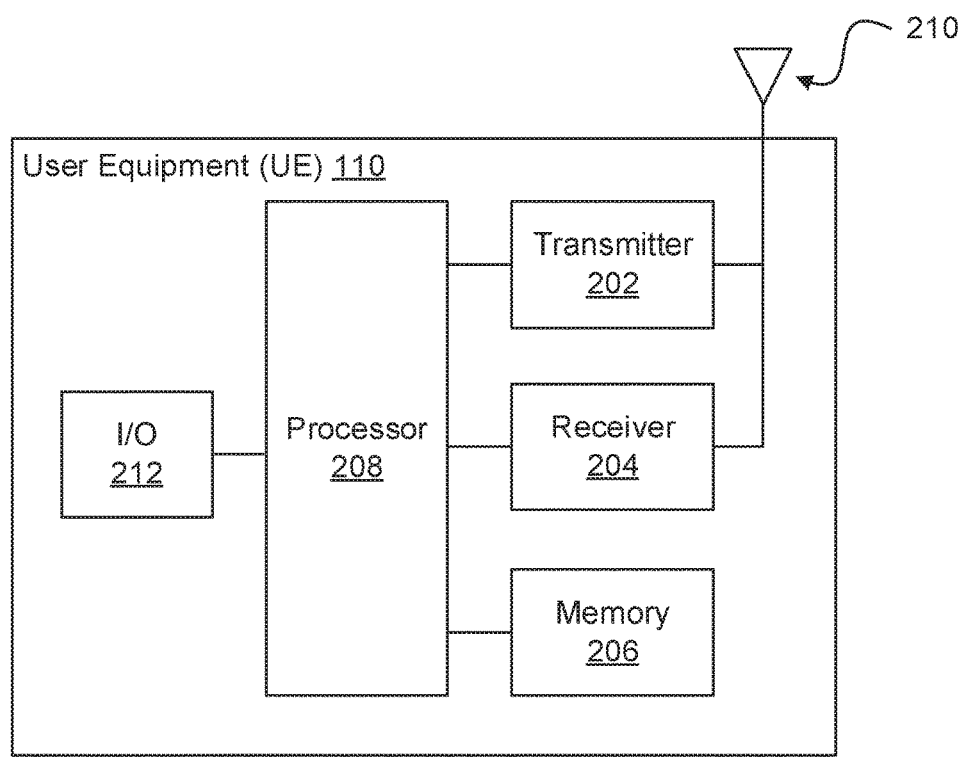
FIG. 2 illustrates exemplary details of an instance of user equipment (UE) introduced in FIG. 1.

FIG. 2 illustrates example details of a UE 110 that may implement the methods and teachings according to this disclosure. The UE 110 may for example be a mobile telephone but may be other devices in further examples such as a desktop computer, laptop computer, tablet, hand-held computing device, automobile computing device and/or other computing devices. As shown in the figure, the exemplary UE 110 is shown as including at least one transmitter 202, at least one receiver 204, memory 206, at least one processor 208, and at least one input/output device 212. The processor 208 can implement various processing operations of the UE 110. For example, the processor 208 can perform signal coding, data processing, power control, input/output processing, or any other functionality enabling the UE 110 to operate in the system 100 (FIG. 1). The processor 208 may include any suitable processing or computing device configured to perform one or more operations. For example, the processor 208 may include a microprocessor, microcontroller, digital signal processor, field programmable gate array, or application specific integrated circuit.

The transmitter 202 can be configured to modulate data or other content for transmission by at least one antenna 210. The transmitter 202 can also be configured to amplify, filter and a frequency convert RF signals before such signals are provided to the antenna 210 for transmission. The transmitter 202 can include any suitable structure for generating signals for wireless transmission.

The receiver 204 can be configured to demodulate data or other content received by the at least one antenna 210. The receiver 204 can also be configured to amplify, filter and frequency convert RF signals received via the antenna 210. The receiver 204 can include any suitable structure for processing signals received wirelessly. The antenna 210 can include any suitable structure for transmitting and/or receiving wireless signals. The same antenna 210 can be used for both transmitting and receiving RF signals, or alternatively, different antennas 210 can be used for transmitting signals and receiving signals.

It is appreciated that one or multiple transmitters 202 could be used in the UE 110, one or multiple receivers 204 could be used in the UE 110, and one or multiple antennas 210 could be used in the UE 110. Although shown as separate blocks or components, at least one transmitter 202 and at least one receiver 204 could be combined into a transceiver. Accordingly, rather than showing a separate block for the transmitter 202 and a separate block for the receiver 204 in FIG. 2, a single block for a transceiver could have been shown.

The UE 110 further includes one or more input/output devices 212. The input/output devices 212 facilitate interaction with a user. Each input/output device 212 includes any suitable structure for providing information to or receiving information from a user, such as a speaker, microphone, keypad, keyboard, display, or touch screen.

In addition, the UE 110 includes at least one memory 206. The memory 206 stores instructions and data used, generated, or collected by the UE 110. For example, the memory 206 could store software or firmware instructions executed by the processor(s) 208 and data used to reduce or eliminate interference in incoming signals. Each memory 206 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

Figure 3:
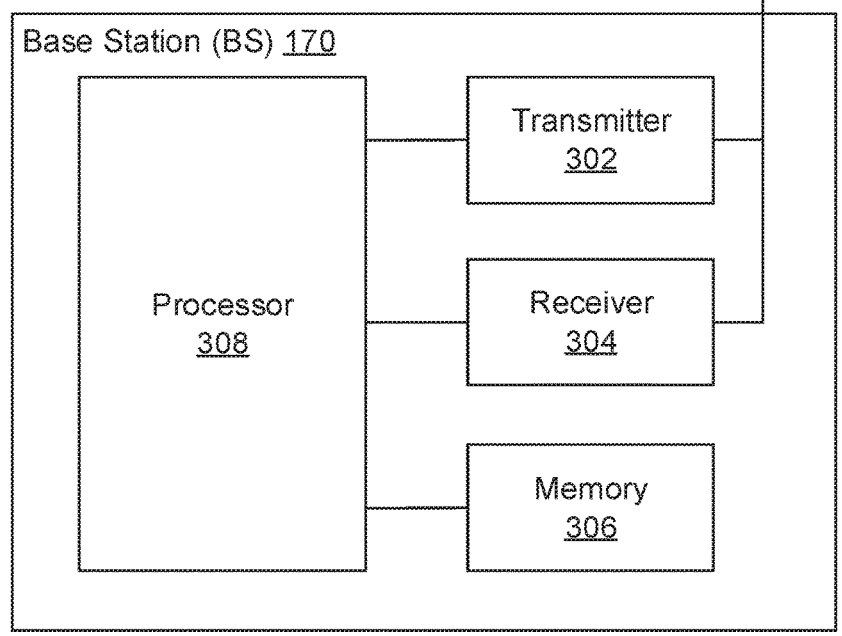
FIG. 3 illustrates exemplary details of an instance of a base station (BS) introduced in FIG. 1.

FIG. 3 illustrates an example BS 170 that may implement the methods and teachings according to this disclosure. As shown in the figure, the BS 170 includes at least one processor 308, at least one transmitter 302, at least one receiver 304, one or more antennas 310, and at least one memory 306. The processor 308 implements various processing operations of the BS 170, such as signal coding, data processing, power control, input/output processing, or any other functionality. Each processor 308 includes any suitable processing or computing device configured to perform one or more operations. Each processor 308 could, for example, include a microprocessor, microcontroller, digital signal processor, field programmable gate array, or application specific integrated circuit.

Each transmitter 302 includes any suitable structure for generating signals for wireless transmission to one or more UEs 110 or other devices. Each receiver 304 includes any suitable structure for processing signals received wirelessly from one or more UEs 110 or other devices. Although shown as separate blocks or components, at least one transmitter 302 and at least one receiver 304 could be combined into a transceiver. Each antenna 310 includes any suitable structure for transmitting and/or receiving wireless signals. While a common antenna 310 is shown here as being coupled to both the transmitter 302 and the receiver 304, one or more antennas 310 could be coupled to the transmitter(s) 302, and one or more separate antennas 310 could be coupled to the receiver(s) 304. Each memory 306 includes any suitable volatile and/or non-volatile storage and retrieval device(s).

The technology described herein can be implemented using hardware, software, or a combination of both hardware and software. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information, and which can be accessed by a computer. A computer readable medium or media does (do) not include propagated, modulated or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

Figure 4:
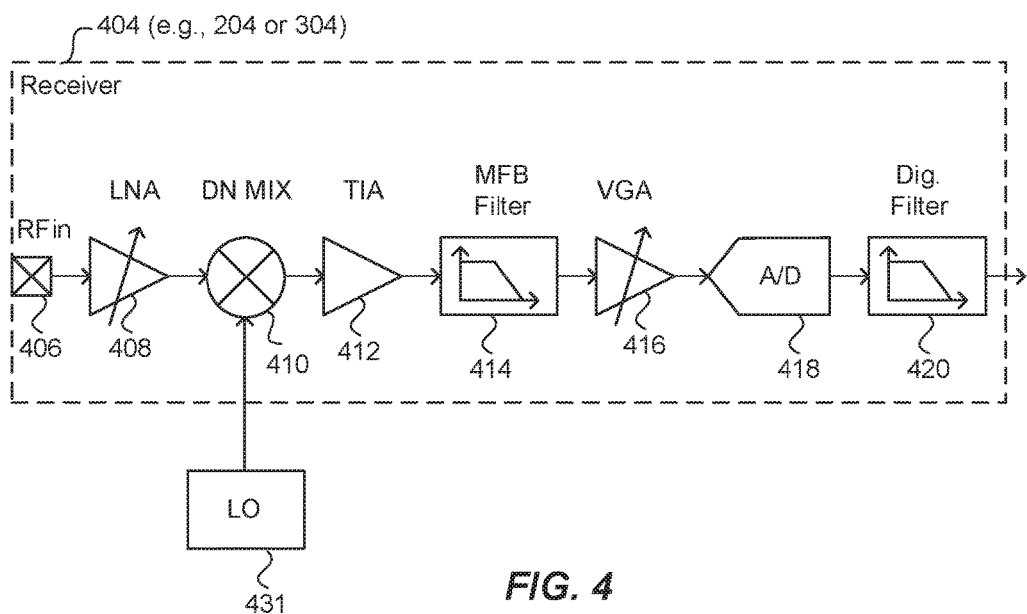
FIG. 4 illustrates exemplary details of a receiver included in a UE or a BS shown in FIGS. 2 and 3.

FIG. 4 illustrates exemplary details of a receiver 404, which can be the receiver 204 included in the UE 110 (shown in FIG. 2) or the receiver 304 included in the BS 170 (shown in FIG. 3) but is not limited thereto. Referring to FIG. 4, the receiver 404 is shown as including an input 406 at which is received a radio frequency (RF) signal, and thus, the input 406 can also be referred to as the RF input 406. The RF input 406 can be coupled to an antenna or a coupler but is not limited thereto. The RF signal received by the RF input 406 is provided to a low noise amplifier (LNA) 408, which may have an adjustable gain. The LNA 408 amplifies the relatively low-power RF signal it receives without significantly degrading the signal's signal-to-noise ratio (SNR). The amplified RF signal that is output by the LNA 408 is provided to a mixer 410. The mixer 410, in addition to receiving the amplifier RF signal from the LNA 408, also receives an oscillator signal (e.g., from a local oscillator 431), and adjusts the frequency of the amplifier RF signal, e.g., from first frequency to a second frequency that is lower than the first frequency. More specifically, the mixer 410 can be a down-mixer (DN MIX) that frequency down-converts the amplified RF signal from a relatively high frequency to a baseband frequency, or an intermediate frequency (IF) that is offset from the baseband frequency.

Still referring to FIG. 4, the frequency down-converted RF signal that is output from the mixer 410 is shown as being provided to a trans-impedance amplifier (TIA) 412. The TIA 412 acts as a current buffer to isolate a multi-feedback (MFB) filter 414 that is downstream of the TIA 412, from the mixer 410 that is upstream of the TIA 412. The MFB filter 414 low pass filters the frequency down-converted RF signal, to filter out high frequency signal components that are not of interest, such as HF noise. The filtered RF signal that is output from the MFB filter 414 is provided to a variable gain amplifier (VGA), which is used to amplify the RF signal before it provided to an analog-to-digital converter (A/D) 418, which converts the RF signal from an analog signal to a digital signal. The digital signal output from the A/D 418 is then provided to a digital filter 420, which performs additional filtering to remove out of band signal components and attenuates quantization energy from the A/D 418. The filtered digital signal that is output by the digital filter 420 is then provided to further digital circuitry that is downstream from the digital filter 420. Such further digital circuitry can include, for example, a digital signal processor (DSP), but is not limited thereto. The same DSP, or a different DSP, can be used to implement the digital filter 420.

Figure 5:
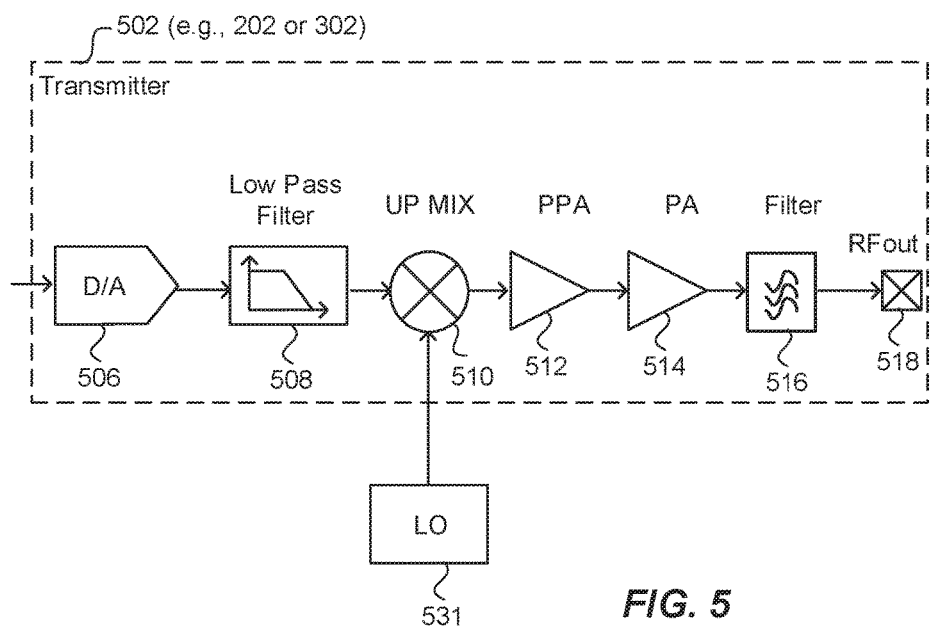
FIG. 5 illustrates exemplary details of a transmitter included in a UE or a BS shown in FIGS. 2 and 3.

FIG. 5 illustrates exemplary details of a transmitter 502, which can be the transmitter 202 included in the UE 110 (shown in FIG. 2) or the transmitter 302 included in the BS 170 (shown in FIG. 3) but is not limited thereto. Referring to FIG. 5, the transmitter 502 is shown as including a Digital-to-Analog (D/A) Converter (DAC), DAC 506, which converts a digital input from, for example processor 208 or processor 308 into an analog RF signal and provides the RF signal to Low Pass Filter 508, which filters the RF signal and provides the filtered RF signal to mixer 510. Mixer 510, in addition to receiving the filtered RF signal from Low Pass Filter 508, also receives an oscillator signal from local oscillator 531 and adjusts the frequency of the RF signal, e.g. from a first frequency to a second frequency that is higher than the first frequency. More specifically, mixer 510 may be an up-mixer (UP MIX) that frequency up-converts the filtered RF signal from a relatively low frequency (e.g. baseband frequency, or an intermediate frequency (IF) that is offset from the baseband frequency) to a relatively high frequency. The RF signal from mixer 510 is then amplified by a Pre-Power Amplifier ("PPA"), PPA 512, and a Power Amplifier ("PA"), PA 514 and filtered by filter 516 before being provided to an RF output 518 (RFout). For example, RF output 518 may be coupled to an antenna or a coupler but is not limited thereto.

Components of receiver 404 and transmitter 502 may include various resistors used for various purposes. For example, filters such as MFB filter 414, Low Pass Filter 508 and Filter 516 may use resistors of known resistance (e.g. in an RC network, or other network that includes one or more resistors). Resistors may also be used in filters in a Phase Locked Loop (PLL) in a local oscillator such as local oscillator 431 or local oscillator 531 or other components in UE 110 and BS 170. In many filters the resistance of a resistor has an impact on filter characteristics, e.g. in an RC network, the RC product (Resistance times Capacitance) is an important characteristic and variation in resistance may affect filter characteristics and thus overall circuit characteristics. For a given circuit such as receiver 404 or transmitter 502 to operate within predefined limits (e.g. within a particular specified range) filters of such circuits may have to operate within predefined limits, which in turn may require resistances of the filters to be within specified ranges. Resistances outside design range may cause circuits to operate outside predefined limits.

In examples of the present technology, which may be applied to resistance used in filters and/or other circuits, a configurable resistor is configured after manufacture to have a desired resistance. This may use a reference resistor for calibration purposes and the configurable resistor can be configured to have a resistance that is very close to that of the reference resistor. Once calibrated, such a configurable resistor may itself be used as a reference resistor for calibration purposes. In some cases, an external reference resistor may no longer be needed and may be disconnected after calibration, which may allow a product to be produced with a reduced bill of materials and thus may reduce cost. For example, a configurable resistor that is calibrated can provide a known resistance in an RC calibration circuit, thus removing resistance variation (R variation), leaving capacitance variation (C variation). Capacitance variation may then be addressed by configuring an adjustable capacitor. In another example, a resistance that is known with accuracy can be used to generate one or more currents with accuracy. A calibrated configurable resistor may be used to provide a desired current, which may be a fixed current provided to a bias block and mirrored for use in circuits requiring an accurate current. For example, a configurable resistor can be used to generate a current that is Proportional To Absolute Temperature (a PTAT current), e.g. by generating a temperature-dependent voltage in a bipolar device and applying it across a configurable resistor that has been calibrated, resistance variation may be eliminated from PTAT current generation. It will be understood that these examples are not limiting and that a calibrated configurable resistor can provide any resistance used in an electronic circuit and may provide benefits in many applications.

Figures 6A, 6B:
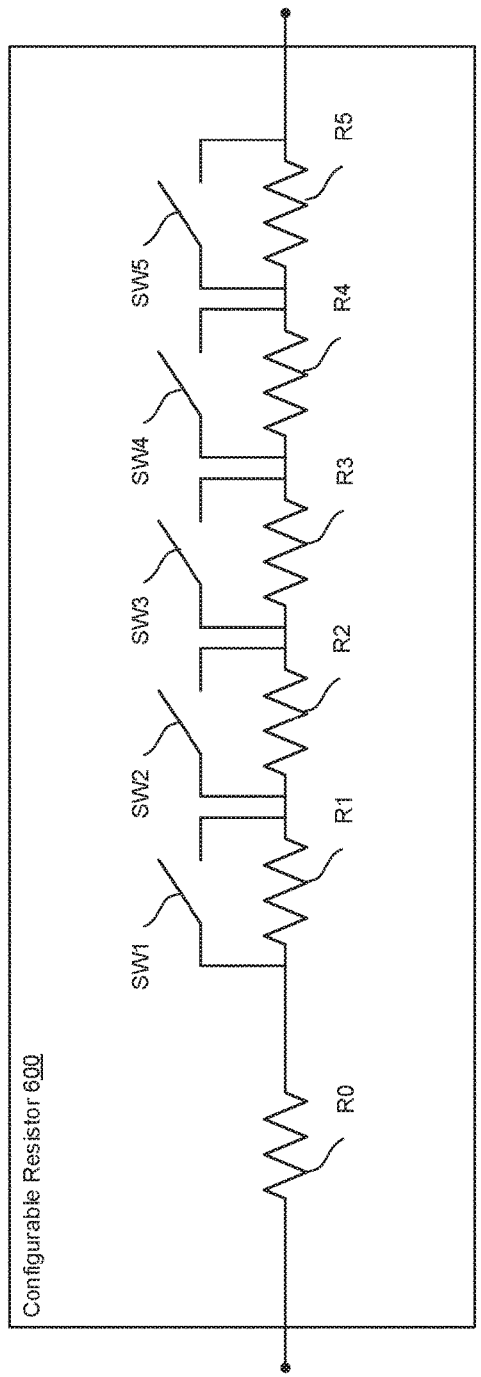
FIGS. 6A-D illustrate exemplary details of a configurable resistor included in components of a UE or a BE shown in FIGS. 2 and 3.

FIG. 6A shows an example of a configurable resistor 600, which may be formed in or on a semiconductor substrate, e.g. in any of the components of UE 110 or BS 170 described above in FIGS. 2-3, including in filters such as MFB filter 414 of receiver 404, Low Pass Filter 508 of transmitter 502, Filter 516 of transmitter 502, and other filters, such as filters in PLLs of local oscillator 431 and local oscillator 531.

While the term "configurable resistor" is used here, it can be seen that configurable resistor 600 includes resistive elements R0, R1, R2, R3, R4, and R5 connected in series, where each resistive element is formed from a portion of resistive material (e.g. polysilicon) with electrical terminals to connect with other components. Configurable resistor 600 may also be referred to as a configurable resistance unit or configurable resistance module and the term "configurable resistor" is not limited to a single resistive element. Resistive elements R0, R1, R2, R3, R4, and R5 are connected in series in this example, while in other configurable resistors, resistive elements may be connected in parallel or otherwise arranged so that the overall resistance of the configurable resistor may be configured according to how the resistive elements are connected. Resistive elements R1, R2, R3, R4, and R5 are connected in parallel with switches SW1, SW2, SW3, SW4, and SW5 respectively to allow resistive elements to be connected or bypassed as desired. By configuring switches SW1, SW2, SW3, SW4, and SW5 the resistance of configurable resistor may be varied from a minimum resistance (the resistance of resistive element R0) to a maximum resistance (the sum of resistances of resistive elements R0, R1, R2, R3, R4, and R5).

Resistive elements R0, R1, R2, R3, R4, and R5 may be formed in any suitable manner, e.g. by deposition and etching of polysilicon or other material of controllable resistance. Because of variation in dimensions and resistivity due to process variations, resistors formed in this way may not be identical from chip to chip on a wafer, or from wafer to wafer. The overall resistance of configurable resistor 600 may be adjusted to a desired value by configuring switches SW1, SW2, SW3, SW4, and SW5 to connect one or more of resistive elements R1, R2, R3, R4, and R5 (in addition to resistive element R0) to achieve a desired resistance. Such configuration may be a one-time configuration (e.g. performed in a factory during testing or initialization) or may be performed multiple times (e.g. performed in response to some triggering event during use so that configuration may be updated at one or more time after initial configuration). In an example, switches SW1, SW2, SW3, SW4, and SW5 are configured by bits of a five-bit configuration code in which bits correspond to switches in a one-to-one correspondence. Such a configuration code may be sent to configurable resistor 600 to cause a reconfiguration of configurable resistor 600.

FIG. 6B shows an example of how bits of a configuration code may correspond to resistive elements R1, R2, R3, R4, and R5 of FIG. 6A and how these correspond to different resistances. Resistive element R5 corresponds to bit b0 (the least significant bit in the configuration code) and has a resistance of $R_{lsb}$ (resistance corresponding to the least significant bit in the configuration code). Resistive element R4 corresponds to bit b1 (the next bit in the configuration code after the least significant bit) and has a resistance of $2R_{lsb}$ i.e. twice the resistance of R5. Resistive element R3 corresponds to bit b2 and has a resistance of $4R_{lsb}$ i.e. four times the resistance of resistive element R5 and twice the resistance of resistive element R4. Resistive element R2 corresponds to bit b3 and has a resistance of $8R_{lsb}$ i.e. eight times the resistance of resistive element R5 and twice the resistance of resistive element R3. Resistive element R1 corresponds to bit b4 and has a resistance of $16R_{lsb}$ i.e. sixteen times the resistance of resistive element R5 and twice the resistance of resistive element R2. Thus, each resistive element has a resistance that is twice the resistance of its neighbor so that each bit of the configuration code may cause a different change in overall resistance of configurable resistor 600, from $R_{lsb}$ for bit b0 to $8R_{lsb}$ for bit b4. This approach can be extended to any number of bits and resistive elements. If all switches SW1, SW2, SW3, SW4, and SW5 are open, resistance of configurable resistor 600 is produced by resistive elements R0, R1, R2, R3, R4, and R5 connected in series, the total resistance is Rfix (the fixed resistance of resistive element R0) plus $31*R_{lsb}$ ($16R_{lsb}+8R_{lsb}+4R_{lsb}+2R_{lsb}+R_{lsb}=31*R_{lsb}$). If all switches SW1, SW2, SW3, SW4, and SW5 are closed, resistance of configurable resistor 600 is simply Rfix. A range of 32 discrete resistance values are thus available. These are stepped values with each discrete resistance value differing from adjacent discrete resistance values by a step, which in this case is $R_{lsb}$. It will be understood that the number of resistive elements used determines the number possible configurations and thus the number of discrete resistance values that may be produced and that the value of $R_{lsb}$ determines the accuracy with which resistance can be configured.

Figure 6C:
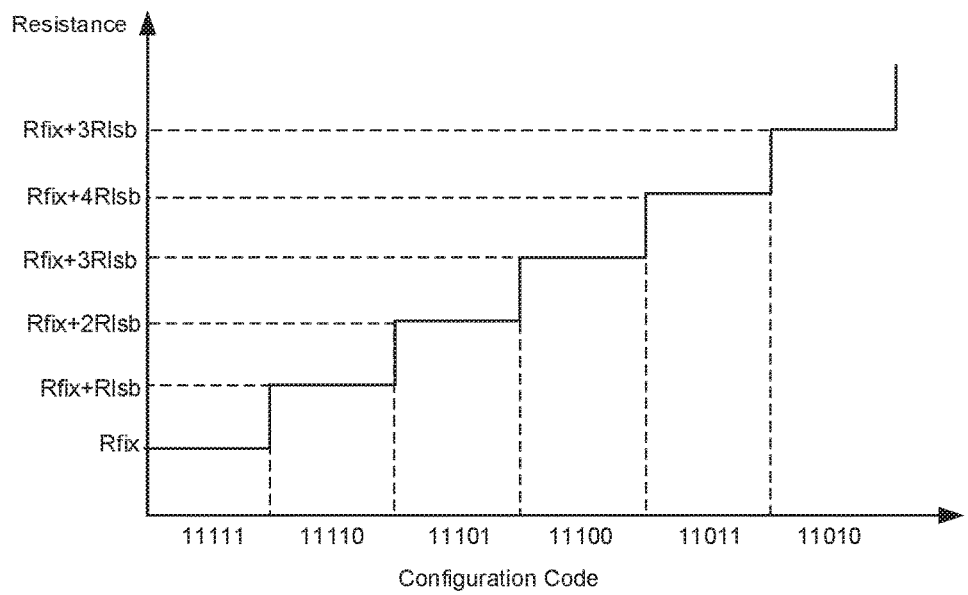

FIG. 6C illustrates stepped resistance values of configurable resistor 600 with each discrete resistance value differing from adjacent discrete resistance values by a step, which in this case is $R_{lsb}$, and each resistance generated by a different configuration produced by a different configuration code. Thus, for example, code 11111 corresponds to all switches SW1, SW2, SW3, SW4, and SW5 being closed so that resistance of configurable resistor 600 is Rfix. Code 11110 corresponds to opening SW5 only so that resistance is Rfix+Rlsb. Code 11101 corresponds to opening SW4 only so that resistance is Rfix+2Rlsb. Code 11100 corresponds to opening SW4 and SW5 only so that resistance is Rfix+3Rlsb and so on, with code 00000 opening all switches SW1, SW2, SW3, SW4, and SW5 so that resistance would be Rfix+31Rlsb (not shown in FIG. 6C). Thus, configuration codes are binary numbers that are assigned sequentially in descending order, with the highest code 11111 assigned to the lowest resistance Rfix, and with each configuration code corresponding to an increase of Rlsb from the previous configuration code in the series. It will be understood that any number of resistive elements may be used in such a configurable resistor to allow a wider range of resistance values and/or greater precision by using smaller resistance steps and that any suitable coding scheme may be used.

A configurable resistor 600 may be configured by means of a configuration code such as illustrated in FIGS. 6B-C so that the resistance can be set to a desired value. In some cases, a fixed resistance may be desired, and resistance may be set by means of a configuration code that is permanently stored (e.g. using fuses, anti-fuses, or other one-time programmable elements). In other examples, a configuration code may be stored in a manner that can be rewritten (e.g. in a register, or non-volatile memory) so that resistance can be changed as needed.

Figure 6D:
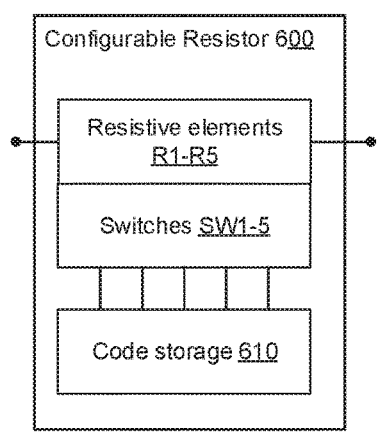

FIG. 6D shows code storage 610 in configurable resistor 600, where code storage 610 may be any suitable form of storage medium that stores a configuration code. Code storage 610 may be formed of one-time writable elements such as fuses, anti-fuses, eFuses, or other such elements and may store a configuration code that is set in a one-time calibration process (e.g. an initialization process in an integrated circuit manufacturing and/or testing facility). Alternatively, code storage 610 may be formed of elements that can be rewritten such as non-volatile memory cells (e.g. flash memory cells, or other electrically erasable memory cells). In some cases, where code storage 610 is rewritable, it may be written with a configuration code in a one-time operation (e.g. when chip containing configurable resistor 600 is incorporated in a system such as UE 110 or BS 170) as part of a product configuration process. In some cases, code storage 610 may be rewritten after an initial configuration process, for example, in response to some triggering event that causes rewriting of the configuration code (e.g. during power-on of UE 110, or in response to some event that causes a reset).

In order for a configurable resistor to have a desired resistance, a calibration process may be carried out. The calibration process may result in finding a target configuration code that configures a configurable resistor to a target resistance (e.g. a target code that, when written in code storage 610 configures configurable resistor 600 to have a target resistance). For example, a calibration process may use a reference resistor (calibration resistor) that is known to have a target resistance with a high degree of accuracy (this may be an external resistor that is not formed on the semiconductor substrate).

Figure 7:
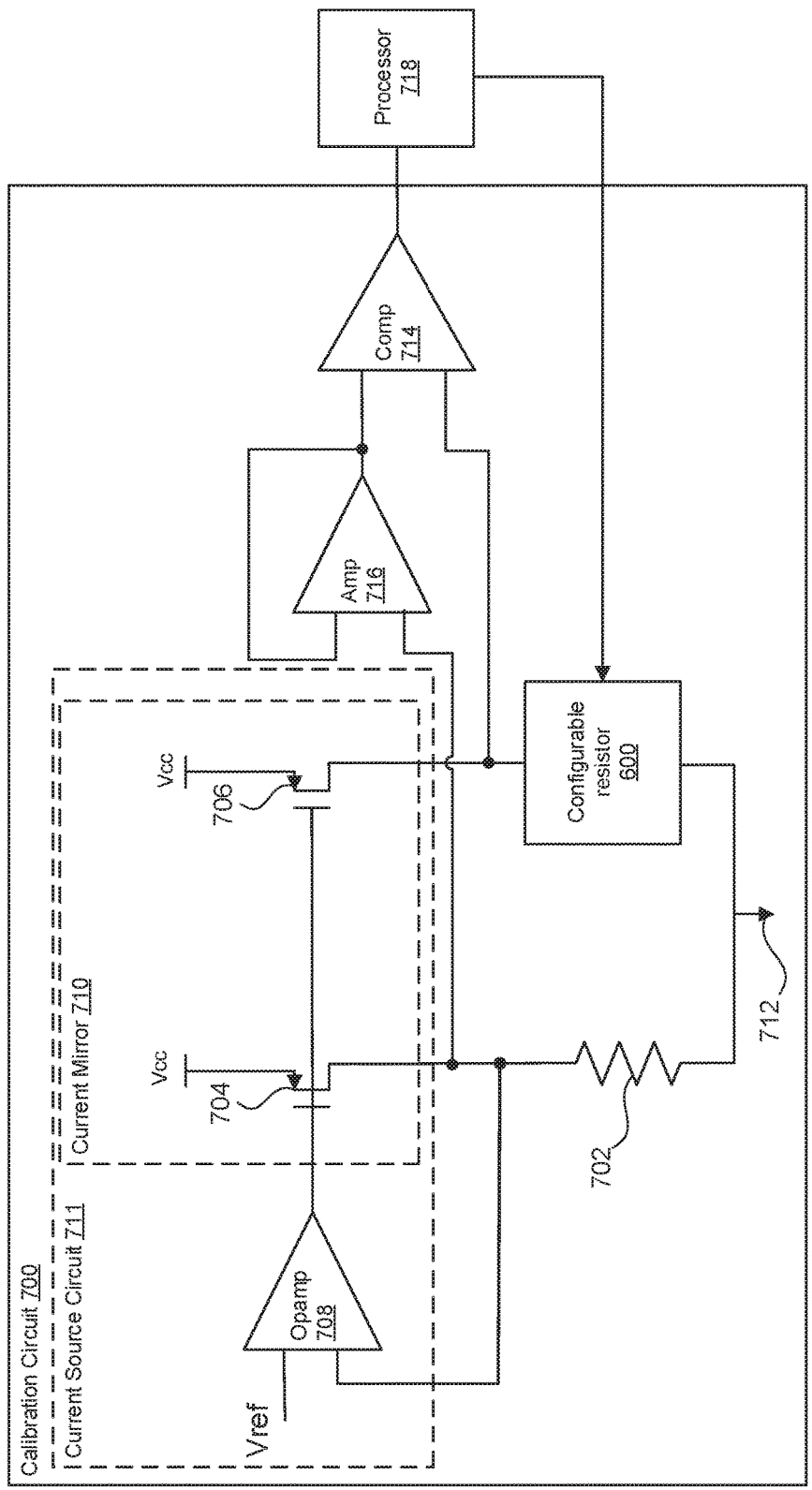
FIG. 7 illustrates exemplary details of a calibration circuit used to calibrate a configurable resistor as shown in FIGS. 6A-D.

FIG. 7 shows an example of a calibration circuit 700 that may be used to carry out a calibration process on a configurable resistor such as configurable resistor 600 of FIG. 6A. FIG. 7 shows a reference resistor 702 connected to a first leg of a current mirror 710 that includes transistor 704 and shows configurable resistor 600 connected to a second leg of current mirror 710 that includes transistor 706. Gates of transistors 704 and 706 (which may be identical MOSFETs) are controlled by the output of Opamp 708, which has an input from the first leg of current mirror 710 (between transistor 704 and reference resistor 702) and an input at a reference voltage Vref. Sources of transistors 704, 706 are connected to a supply voltage, which in this example is Vcc. Current mirror 710 in combination with Opamp 708 in this configuration form a current source circuit 711 to supply current to reference resistor 702 and configurable resistor 600 in parallel. Reference resistor 702 and configurable resistor 600 are both connected to a common terminal 712, which is grounded in this example. In this configuration, current source circuit 711 provides an equal current to reference resistor 702 and configurable resistor 600 based on feedback from the first leg of current mirror 710.

A comparator 714 is connected to upper terminal of reference resistor 702 (through unity gain amplifier 716) and upper terminal of configurable resistor 600 to receive and compare voltages across reference resistor 702 and configurable resistor 600 (which both have lower terminals connected to ground). Comparator 714 provides an output to processor 718, which may use the output from comparator 714 to determine a target configuration. Processor 718 is coupled to configurable resistor 600 by sending configuration codes to configurable resistor 600 for calibration of configurable resistor 600. Such configuration codes may be sent through one or more intermediate circuits. For example, different configuration codes may be sent to configure configurable resistor 600 during a configuration process.

In order to find a target configuration code that configures configurable resistor 600 to have a target resistance at or near the resistance of reference resistor 702, various configuration codes may be tried and a pair of neighboring configuration codes between which the output of comparator 714 flips (changes between high and low, or logic 1 and logic 0). One configuration from such a pair may be considered the target configuration code and may be written in code storage 610 of configurable resistor 600 so that configurable resistor 600 retains the target resistance for subsequent use.

In a first example of a calibration process using calibration circuit 700, calibration codes may be tried in sequence to find where comparator 714 flips. Thus, for example, all configuration codes may be sent in sequence to change the resistance of configurable resistor 600 in steps of Rlsb (e.g. sending configuration codes in descending order from 11111 to 00000 to produce the set of discrete resistance values as shown in FIG. 6C, or from 00000 to 11111 to step down through the set of discrete resistance values). So, for example, where reference resistor 702 has a resistance of 10 ohms, Rfix is 8.3 ohms, and Rlsb is 0.7 ohms, comparator 714 flips between configuration code 11101 (Rfix+2*Rlsb=8.3+2*0.7=9.7 ohms) and configuration code 11100 (Rfix+3*Rlsb=8.3+3*0.7=10.4 ohms). Thus, configuration code 11101 or configuration code 11100 could be chosen as a target configuration code corresponding the resistance of reference resistor 701 and the configuration code could be written to code storage 610 of configurable resistor 600 to configure it accordingly. In some cases, a configurable resistor may have a large number of resistive elements and a large number of bits in a configuration code so that proceeding sequentially through a significant number of such configuration codes to identify where resistance flips may take significant time.

In another example of a calibration process using calibration circuit 700, calibration codes may be tried in a binary search pattern to find where comparator 714 flips. Thus, for example, configuration codes may be sent in an order that depends on the result from the previous configuration code. The first configuration code in such a sequence may be at the middle of the range of configuration codes (and thus produce a resistance in the middle of the range of resistances available, e.g. 10000 in the example above). If the comparator indicates that the resistance of configurable resistor 600 is higher than the resistance of reference resistor 702 then the second configuration code is selected from the range of configuration codes producing lower resistance. The search then focuses on this remaining range and the range of configuration codes producing higher resistance is eliminated. A second configuration code is chosen in the remaining range, e.g. at the mid-point of the remaining range, (e.g. half way between 10000 and 11111, which is 11000 in this example). The output of comparator 714 when this configuration code indicates whether the target configuration code corresponds to higher resistance or lower resistance and the search can then be focused accordingly. Each comparison at a mid-point of the remaining range can be used to identify which half of the remaining range contains the target configuration code and this may be used as the remaining range for a subsequent step. Thus, a target configuration may be found with a smaller number of steps than in the previous example. However, this approach may still involve a large number of steps and requires a processor to determine a subsequent configuration code after each step (in contrast to deterministically stepping through configuration codes). For example, for a configurable resistor with n resistive elements that is configured by an n-bit configuration code, there are $2^n$ configurations and going through them all to find a target configuration requires $2^n$ steps. Using binary search may require only n steps.

Figure 8:
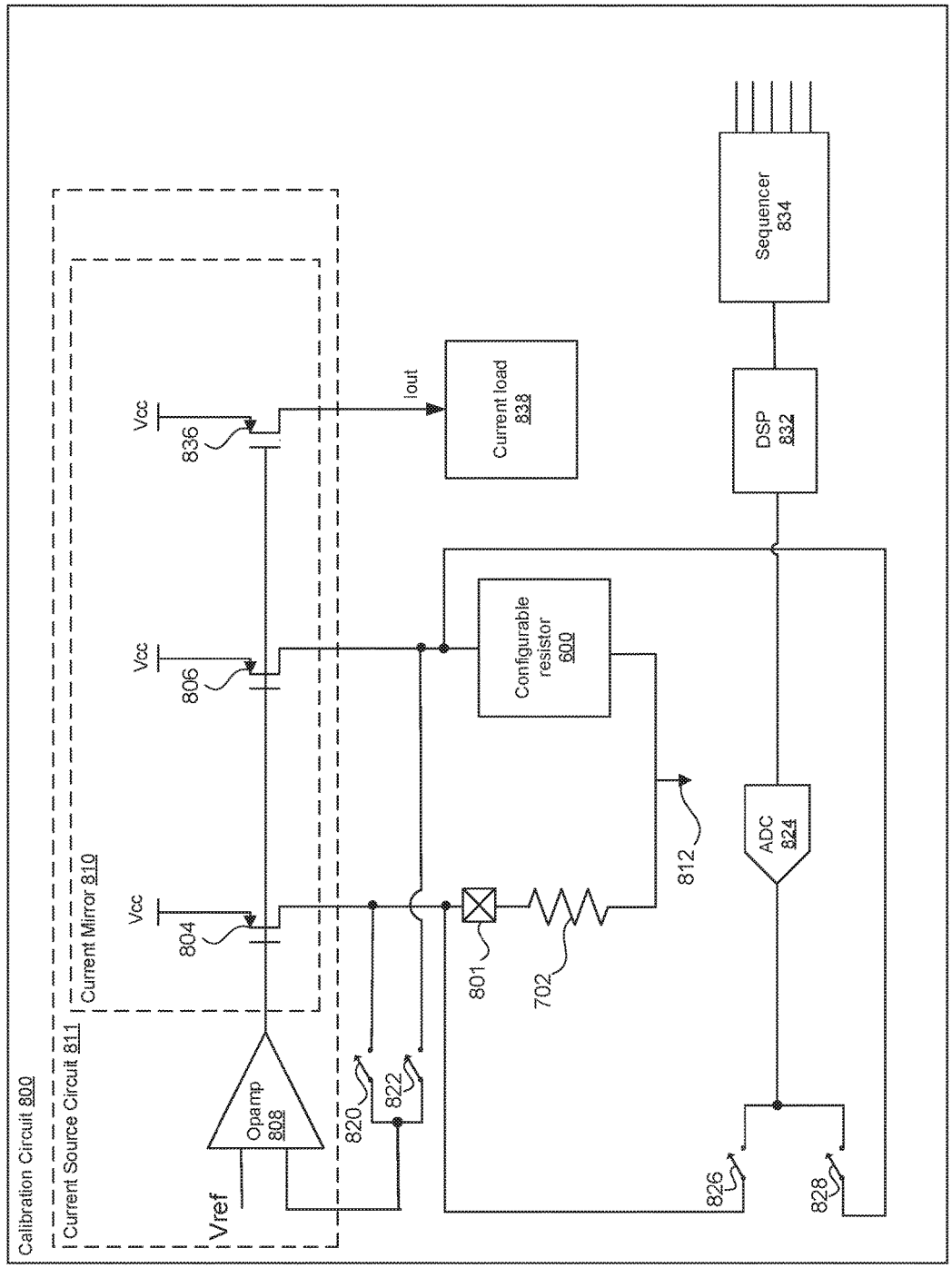
FIG. 8 illustrates exemplary details of another calibration circuit used to calibrate a configurable resistor as shown in FIGS. 6A-D.

FIG. 8 shows an example of a calibration circuit 800 that may be used to carry out a calibration process on a configurable resistor such as configurable resistor 600 of FIG. 6A. FIG. 8 shows reference resistor 702 connected through a switch 801 (which may be a one-time switch such as a fuse, anti-fuse, or similar element used to disconnect reference resistor 702 as desired, e.g. after calibration is complete) to a first leg of a current mirror 810 that includes transistor 804 and shows configurable resistor 600 connected to a second leg of current mirror 810 that includes transistor 806. Gates of transistors 804 and 806 (and transistor 836) are controlled by the output of Opamp 808, which has an input connected through switch 820 from the first leg of current mirror 810 (between transistor 804 and reference resistor 702). The input to Opamp 808 is also connected through switch 822 to the second leg of current mirror 810. Switches 820, 822 may be arranged in a configuration where one switch is closed while the other is open so that the input to Opamp 808 comes from either the first leg or the second leg of current mirror 810, e.g. switches may toggle oppositely based on the same digital signal with one switch closed and one open at a given time. Opamp 808 also has an input at a reference voltage Vref. Thus, the voltage across reference resistor 702 and configurable resistor 600 is controlled using a feedback loop to the gate biasing circuit of Opamp 808, which subtracts reference voltage Vref to generate a gate voltage for transistors 804, 806, and 836 of current mirror 810. The feedback signal may be selected from either reference resistor 702 or configurable resistor 600 using switches 820, 822. Current mirror 810, Opamp 808, and connections between them form current source circuit 811. Sources of transistors 804, 806, and 836 are connected to a supply voltage, which in this example is Vcc. Reference resistor 702 and configurable resistor 600 are both connected to a common terminal 812, which is grounded in this example. In this configuration, current source circuit 811 provides an equal current to reference resistor 702 and configurable resistor 600 based on feedback from either the first leg of current mirror 810 or the second leg of current mirror 810.

An Analog-to-Digital Converter (ADC), ADC 824 is connected to an upper terminal of reference resistor 702 through switch 826 and to an upper terminal of configurable resistor 600 through switch 828, to receive voltages across reference resistor 702 and configurable resistor (which have lower terminals connected to ground). Switches 826 and 828 may be arranged in a configuration where one switch is closed while the other is open so that the input to ADC 824 comes from either the first leg or the second leg of current mirror 810, e.g. switches may toggle oppositely based on the same digital signal with one switch closed and one open at a given time. ADC 824 provides an output to a calculation circuit, which in this example is DSP 832. A calculation circuit such as DSP 832 may use the output from ADC 824 to calculate an adjustment for configurable resistor 600, e.g. to determine a target configuration. DSP 832 may be any Digital Signal Processor (DSP) that is configured to perform digital operations to calculate a target configuration code. Any suitable circuit capable of simple arithmetic operations may be used as a calculation circuit instead of DSP 832. DSP 832 is coupled to sequencer 834, which provides signals to components of calibration circuit 800. For example, sequencer 834 controls switches 820, 822, 826, and 828 (and may control additional switches and other components) and adjusts configurable resistor 600 by sending configuration codes to configurable resistor 600. Connections between sequencer 834 and components of calibration circuit 800 are omitted for clarity.

In addition to providing an equal current to reference resistor 702 and configurable resistor 600, current mirror 810 includes a third leg that includes transistor 836 (e.g. a MOSFET that may be identical to transistors 804 and 806) which has its source connected to supply voltage, in this example Vcc, and receives a gate voltage from Opamp 808. The third leg of current mirror 810 provides an output current Iout to a current load 838, where Iout is equal to the current through the first two legs (i.e. current Iout is the current through each transistor 804, 806, and 836). In some configurations, Iout may be used as a constant current that is determined by the resistance of configurable resistor 600 so that, once calibrated, configurable resistor can be used to generate an output current with a high degree of accuracy.

In contrast with calibration circuit 700, which includes comparator 714 to compare voltages from reference resistor 702 and configurable resistor 600, no comparator is provided in calibration circuit 800. ADC 824 is used to sample voltages from reference resistor 702 and configurable resistor 600 through switches 826 and 828 respectively (e.g. by connecting switches 826 and 828 at different times) so that no direct comparison is necessary. ADC 824 provides digital values corresponding to voltages sampled from reference resistor 702 and configurable resistor 600. Digital values including a digital reference value from reference resistor 702 are used by DSP 832 to calculate an adjustment to configurable resistor 600, which in this example is a target configuration code (a code that, when used to configure configurable resistor 600 results in a resistance at or near the resistance of reference resistor 702). This can be done with a small number of digital values so that the number of samples taken may be small and the calculation may be rapidly performed by simple circuitry. A fixed sequence of samples may be used, without requiring decisions based on previous samples such as needed to implement a binary search algorithm. Thus, digital interactions may be simplified compared with previous examples and a sequencer, such as sequencer 834, may operate autonomously, applying a predetermined sequence without digital interactions with other circuits, and may thus be simplified. Calculation may occur after all samples are obtained and no calculation may be required during sampling.

Figure 9A:
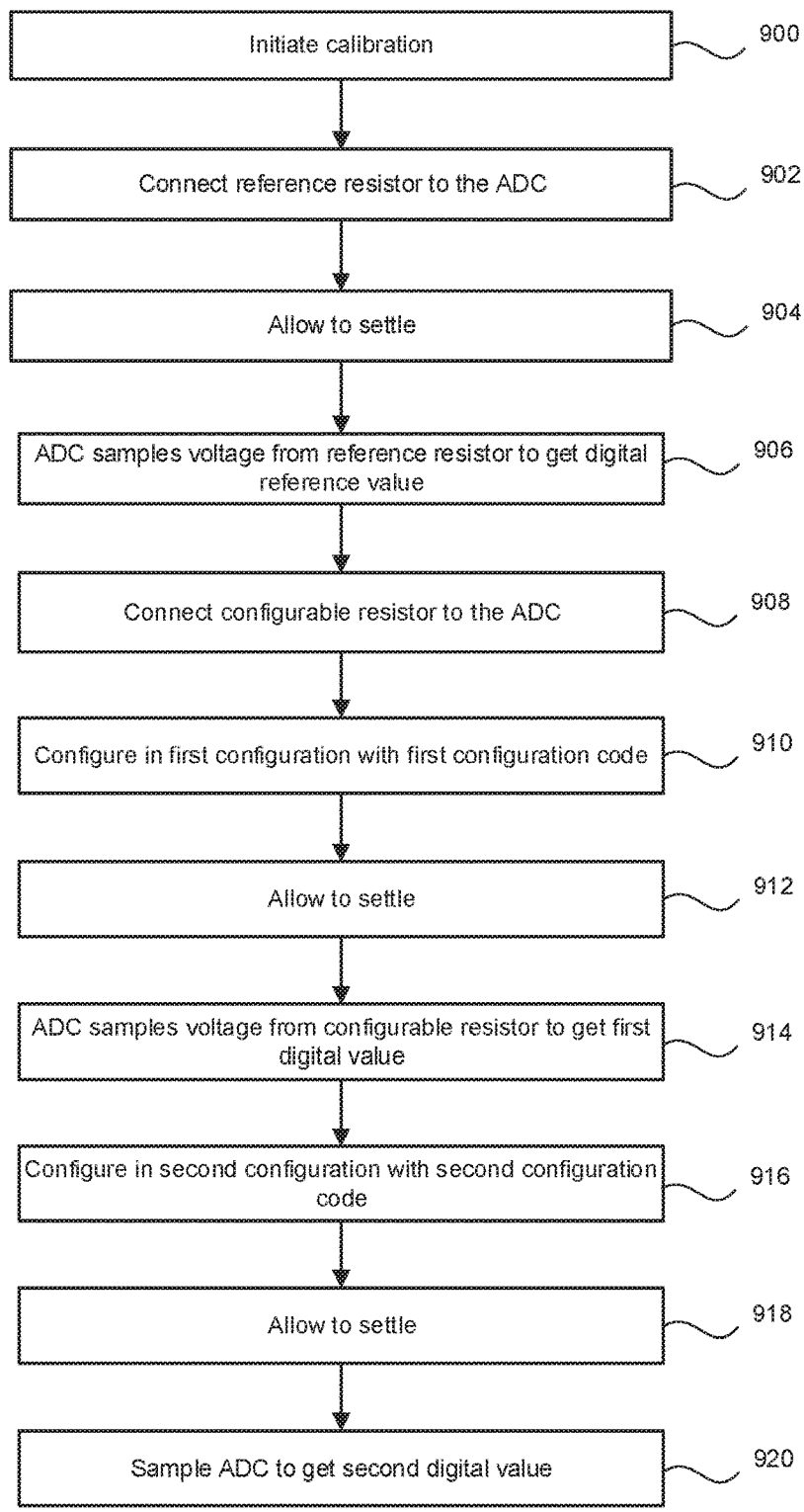
FIGS. 9A-B illustrate exemplary details of a methods of calibrating a configurable resistor as shown in FIGS. 6A-D using a calibration circuit as shown in FIG. 8.
Figure 9B:
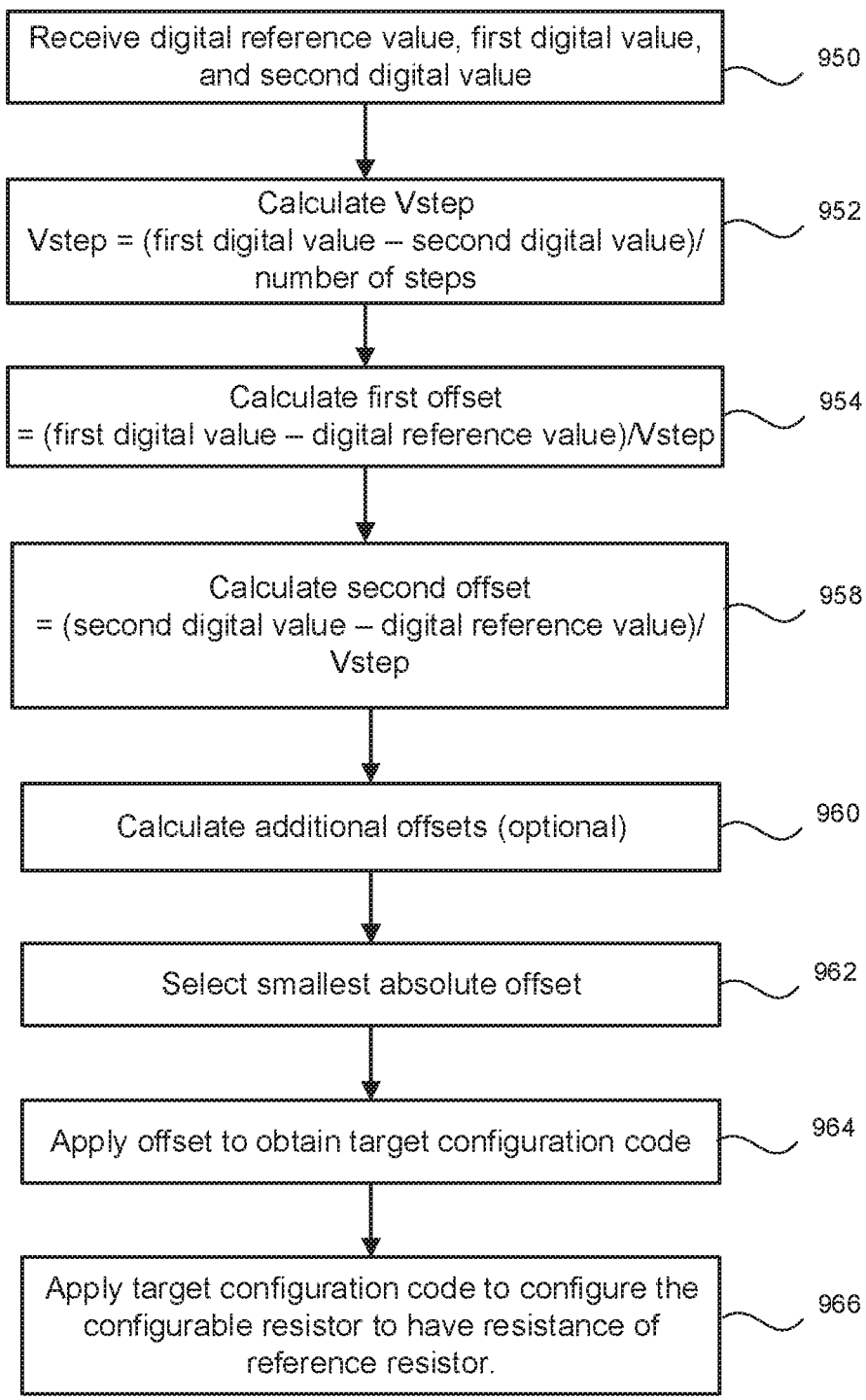

FIGS. 9A-B illustrate a method of calibrating a configurable resistor, which is described with respect to calibration circuit 800 of FIG. 8. FIG. 9A includes sampling to obtain digital values and FIG. 9B includes calculating a target configuration from the digital values (which may be performed by DSP 832 or other calculation circuit). When a calibration process is initiated 900, reference resistor 702 is connected (e.g. by closing switch 820 and opening switch 822 to connect Opamp 808 to the upper terminal of reference resistor 702 and closing switch 826 and opening switch 828 to connect the input of ADC 824 to reference resistor 702 while the lower terminals of reference resistor 702 and configurable resistor 600 are connected to common terminal 812, which is grounded) 902. Calibration circuit 800 is allowed to settle 904, for a period of time to ensure a stable sample. Then, ADC 824 samples voltage from the reference resistor to get a digital reference value 906. It will be understood that the accuracy of this value (and other values collected by ADC 824) and thus the accuracy of the calibration depends on the resolution of ADC 824. Configurable resistor 600 is then connected to the ADC 908 (e.g. by opening switch 826 and closing switch 828 to connect the input of ADC 824 to configurable resistor 600 while the lower terminals of reference resistor 702 and configurable resistor 600 are connected to common terminal 812, which is grounded and while switch 820 remains closed and switch 822 remains open to generate a fixed current from current mirror 810). Configurable resistor 600 is configured in a first configuration with a first configuration code 910. For example, DSP 832 may select a first configuration code and sequencer 834 may send the configuration code to configurable resistor 600 to implement the corresponding configuration. Calibration circuit 800 is allowed to settle 912, for a period of time to ensure a stable sample. Then, ADC 824 samples voltage from configurable resistor 600 to get a first digital value 914. Configurable resistor 600 is then configured in a second configuration with a second configuration code 916. For example, DSP 832 may select a second configuration code and sequencer 834 may send the configuration code to configurable resistor 600 to implement the corresponding configuration. Calibration circuit 800 is allowed to settle 918, for a period of time to ensure a stable sample. Then, ADC 824 samples voltage from configurable resistor 600 to get a second digital value 920.

First and second configuration codes may be chosen to span a suitable range of resistance. For example, a first configuration corresponding to the first configuration code may give a relatively low resistance while a second configuration corresponding to the second configuration code may give a relatively high resistance. In one example, the range of discrete resistances available may be considered as an upper resistance range and a lower resistance range and first and second configurations may be selected to be at or near the middle of upper and lower resistance ranges. Thus, for the example of a configurable resistor with five resistive elements configured by a five-bit configuration code shown in FIGS. 6A-B, the range includes 32 discrete resistances which may be divided into an upper resistance range corresponding to configuration codes 00000 to 01111 and a lower resistance range corresponding to configuration code 10000 to 11111. First and second configuration codes may be selected to correspond to the middle of these ranges, e.g. 01000 and 11000. More generally, where the digital configuration code is an n digit code, the configurable resistor has a configuration range that includes $2^n$ configurations, and the first configuration and second configuration may be equally spaced from a mid-point of the configuration range at 2n/4 above and below the mid-point of the configuration range respectively.

FIG. 9B illustrates how the first and second digital values and the reference digital value obtained in FIG. 9A may be used by a calculation circuit (here, DSP 832) to calculate a target configuration code. DSP 832 receives the digital reference value, first digital value, and second digital value 950, i.e. receives values from ADC 824. DSP 832 calculates a step voltage Vstep, where Vstep=(first digital value–second digital value)/number of steps 952. Step voltage Vstep corresponds to the voltage difference between any two adjacent configurations of configurable resistor 600 (configurations generated by configuration codes differing by 1) when connected in calibration circuit 800 to receive current Iout. Thus, Vstep corresponds to resistance step Rlsb illustrated in FIGS. 6A-C. The voltage difference between the first and second samples from calibration circuit 800 (first digital value–second digital value) is divided by the number of steps separating them. The number of steps may be obtained by subtracting the second configuration code from the first configuration code in this example in which configuration codes are assigned sequentially, e.g. for first and second configuration codes 01000 and 11000 the difference is 10000 configurations or steps in binary, or 16 configurations in decimal.

Knowing Vstep allows the voltage difference between any two samples to be converted into the number of steps (and number of configuration codes) between them, i.e. to calculate an offset in terms of configurations, or configuration codes. The voltage difference between a sample from configurable resistor 600 and reference resistor 702 may be converted in this way to give an offset in terms of configurations, or configuration codes, from the configuration code used to generate the sample. In the example of FIG. 9B, a first offset is calculated by dividing the difference between the first digital value and the digital reference value by the step voltage Vstep, i.e. (first digital value–digital reference value)/Vstep 954. A second offset is calculated by dividing the difference between the second digital value and the digital reference value by the step voltage, Vstep, i.e. (second digital value–digital reference value)/Vstep 958. In some cases, more than two samples may be used, and additional offsets may (optionally) be calculated 960. Two or more offsets may be combined to obtain a target configuration code. For example, by averaging, or by selecting one that is likely to be closer to the resistance of the reference resistor. For example, a closer sample may give a more accurate result. In the example of FIG. 9B, the smallest absolute offset is selected 962 (e.g. the smaller of the first offset, the second offset, and any additional offsets, whether positive or negative). This offset is then applied to obtain the target configuration code 964. Thus, where the first offset is smaller (first digital value is closer to digital reference value) the first offset is applied to the first configuration code to obtain the target configuration code. The target configuration code is then applied to configure configurable resistor 600 to have the resistance of the reference resistor 966 within the accuracy provided by the range of discrete resistance values available from configurable resistor 600. An advantage of using two or more samples in this way is that any offset or gain errors associated with sampling are eliminated. Offsets in an ADC, opamp, or other components may be accounted for by sampling voltage on the reference resistor and gain errors may be accounted for by taking the difference of two or more samples from the ADC.

In some examples, a current mirror used in a calibration circuit such as calibration circuit 800 may be configurable to provide different mirroring at different times according to how switches in the current mirror are configured. This may be used, for example, to reduce or eliminate effects of mirroring error (to reduce the effects of differences between transistors of a current mirror that cause currents to differ).

Figure 10:
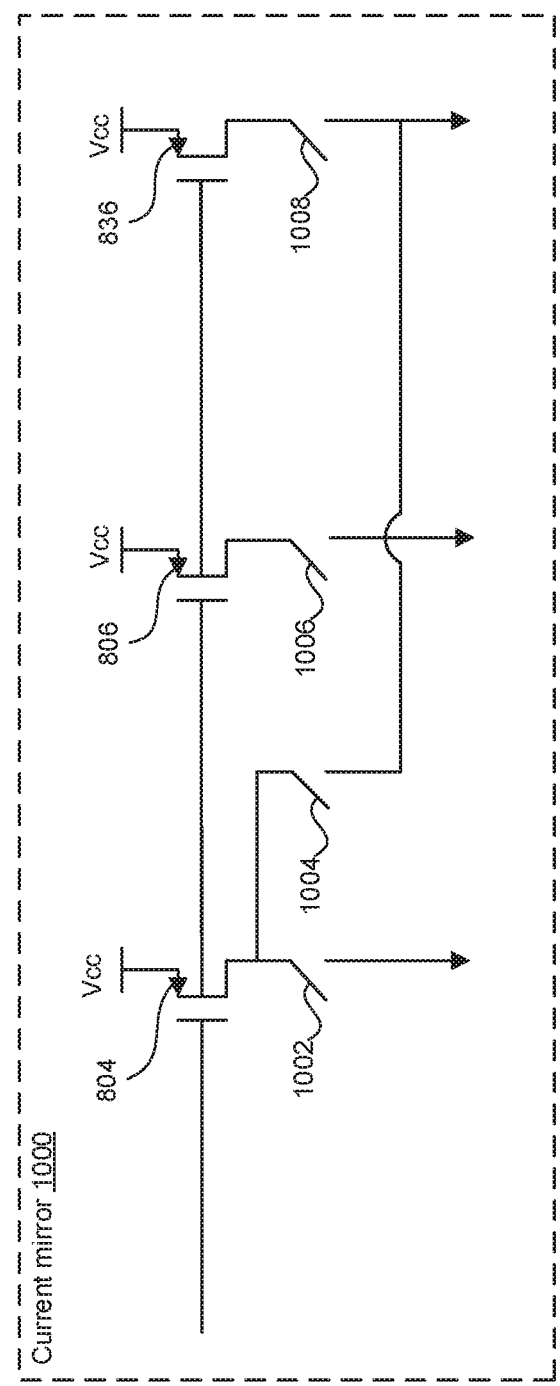
FIG. 10 illustrates exemplary details of a current mirror that may be used in a calibration circuit such as shown in FIG. 8.

FIG. 10 shows an example of a current mirror 1000 that may be used instead of current mirror 810 illustrated in FIG. 8 and may be considered a modification of current mirror 810 (parts are similarly numbered) with the addition of switches to allow different configurations. Current mirror 1000 includes switches 1002 and 1004 connected to transistor 804, switch 1006 connected to transistor 806 and switch 1008 connected to transistor 836. These switches may be controlled by sequencer 834 to allow different configurations of current mirror 1000. Control of switches 1002, 1004, 1006, and 1008 may be combined with control of switches 820, 822, 826, and 828 under the control of sequencer 834. Examples of different configurations of current mirror 1000 used in calibration circuit 800 are described below.

Figure 11:
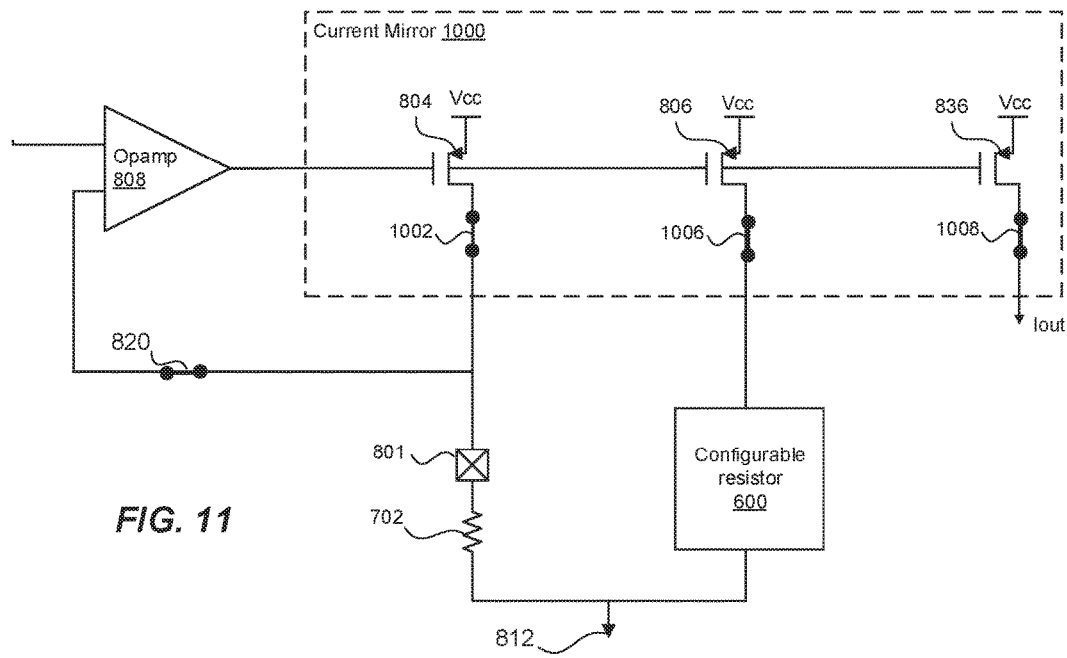
FIG. 11 illustrates exemplary details of a configuration of the current mirror of FIG. 10 in a calibration circuit such as shown in FIG. 8.

FIG. 11 illustrates an example of a first configuration of current mirror 1000, which may be used for calibration purposes and corresponds to the configuration of current mirror 810 shown in FIG. 8. Switches 820, 1002, 1006, and 1008 are closed in this configuration. Unconnected components are omitted in this view (e.g. switches 822 and 1004) and not all components of calibration circuit 800 are shown for simplicity and clarity of illustration. The operation of current mirror 1000 in this configuration to obtain a target configuration code was previously described with respect to FIGS. 8-9B. [ ] It can be seen that in this configuration Iout generated by transistor 836 remains available so that a fixed current may continue to be provided throughout a calibration process and circuits using such a fixed current (e.g. current load 836) may continue to operate.

Figure 12:
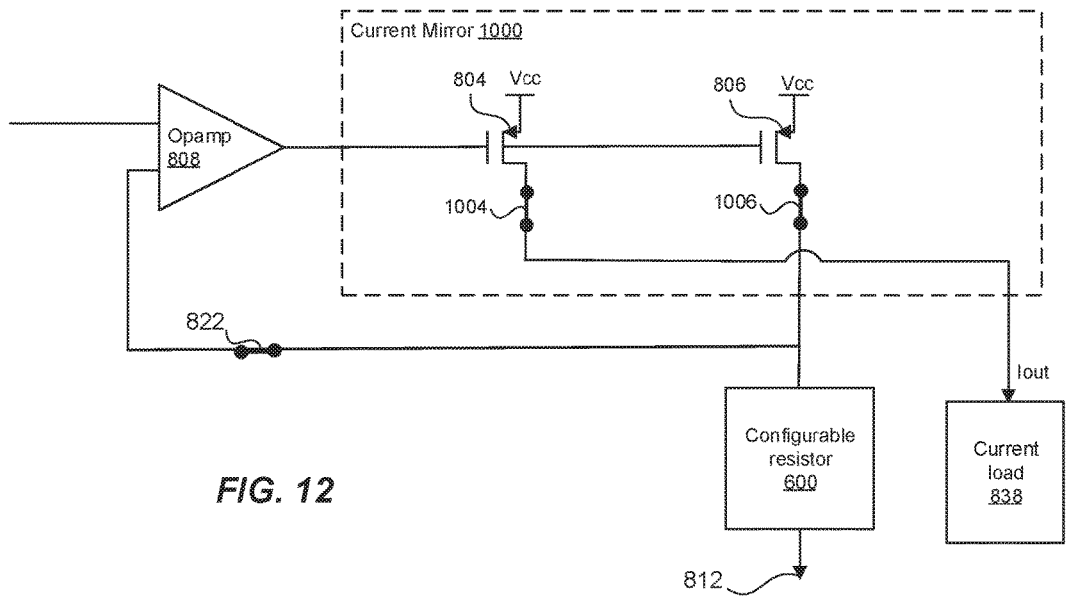
FIG. 12 illustrates exemplary details of another configuration of the current mirror of FIG. 10 in a calibration circuit such as shown in FIG. 8.

When configurable resistor 600 has been configured to have a target configuration using a target configuration code calculated as described above, current mirror 1000 may be reconfigured as illustrated in FIG. 12 by closing switch 1004 to thereby connect transistor 804 of the first leg of current mirror 1000 to current load 838 and provide output current Iout through transistor 804 of the first leg of current mirror 1000 (instead of through transistor 836 of the third leg). Switches 1002 and 1008 are open in this configuration (and are omitted from this view along with elements connected to them). Thus, transistors 804 and 806 are used for calibration and are also used to provide Iout after calibration. In this way, mirroring error may be reduced or eliminated. For example, where mirroring error is $\alpha$, the currents through transistors 804 and 806 are in the ratio 1:1+$\alpha$ and so for the same voltage Vref at upper terminals of reference resistor 702 and configurable resistor 600 during calibration, configurable resistor 600 has a lower resistance than reference resistor 702 (i.e. $V_{ref}=RI=R_{reference}*I_{reference}=R_{config}*(1+\alpha)I_{reference}$, so that $R_{config}=R_{reference}/(1+\alpha)$, where $R_{reference}$ is the resistance of reference resistor 702 and $R_{config}$ is the resistance of configurable resistor 600 after calibration and configuration). Generating Iout by current mirroring based on configurable resistance 600 as shown means that $Iout=V_{ref}/R_{config}*1/(1+\alpha)=V_{ref}/R_{reference}*(1+\alpha)/(1+\alpha)=V_{ref}/R_{reference}$ so that mirroring error is eliminated. Thus, a highly accurate reference current may be provided and may be used by any component that requires an accurate current (e.g. in receiver 404, transmitter 502, PLLs of local oscillator 431 or local oscillator 531, or elsewhere).

Figure 13:
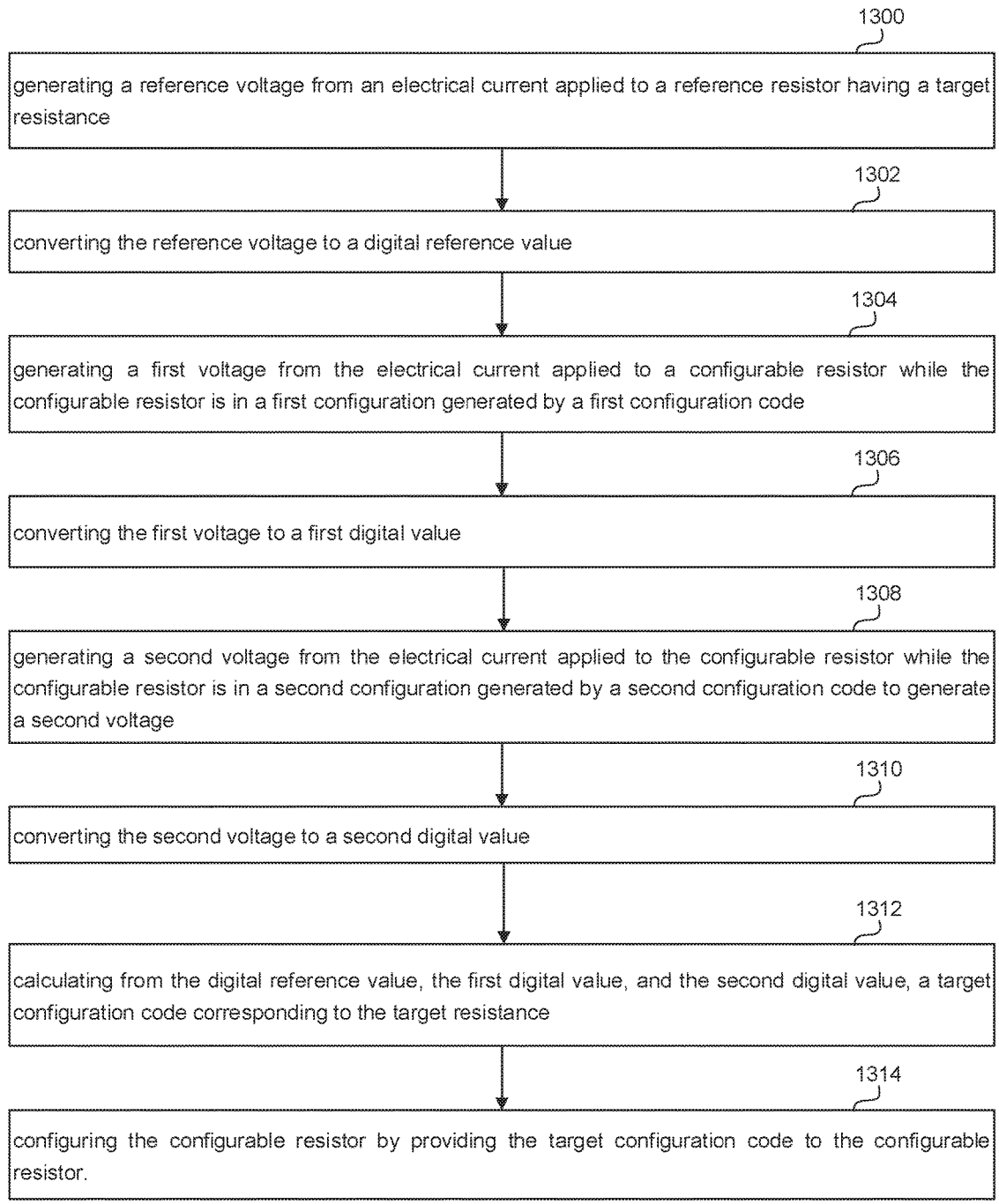
FIG. 13 illustrates exemplary details of a method of calibrating a configurable resistor using a calibration circuit such as shown in FIG. 8.

FIG. 13 illustrates a method that includes generating a reference voltage from an electrical current applied to a reference resistor having a target resistance 1300 and converting the reference voltage to a digital reference value 1302. The method further includes generating a first voltage from the electrical current applied to the configurable resistor while the configurable resistor is in a first configuration generated by a first configuration code 1304, converting the first voltage to a first digital value 1306, generating a second voltage from the electrical current applied to the configurable resistor while the configurable resistor is in a second configuration generated by a second configuration code to generate a second voltage 1308, and converting the second voltage to a second digital value 1310. The method further includes calculating from the digital reference value, the first digital value, and the second digital value, a target configuration code corresponding to the target resistance 1312 and configuring the configurable resistor by providing the target configuration code to the configurable resistor 1314.

Figure 14A:
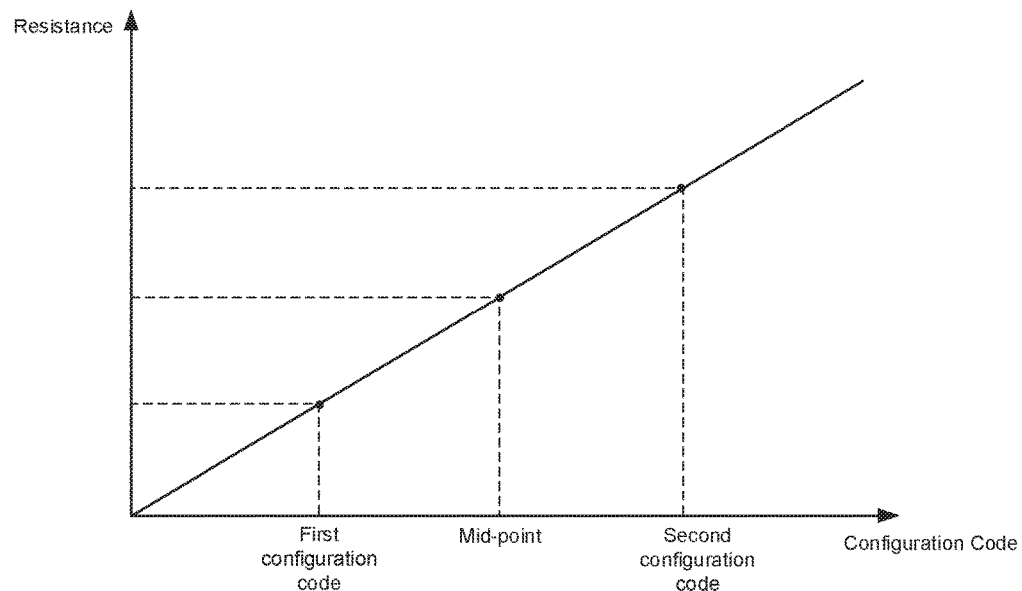
FIGS. 14A-C illustrate examples of sample configuration codes used in a calibration circuit such as shown in FIG. 8.

While the above examples refer to using two configurations of configurable resistor 600 to obtain two samples from an ADC (two digital values) it will be understood that any number of samples may be used. FIG. 14A illustrates the samples as described above, where resistance is on the vertical axis and configuration codes along the horizontal axis. FIG. 14A represents the range of resistances and configuration codes of configurable resistor 600 divided at mid-point into an upper resistance range and a lower resistance range. A first configuration code is chosen as the middle of the lower resistance range and a second configuration code is chosen as the middle of the upper resistance range. Thus, using just three samples (including a reference sample) calibration may be performed.

Figure 14B:
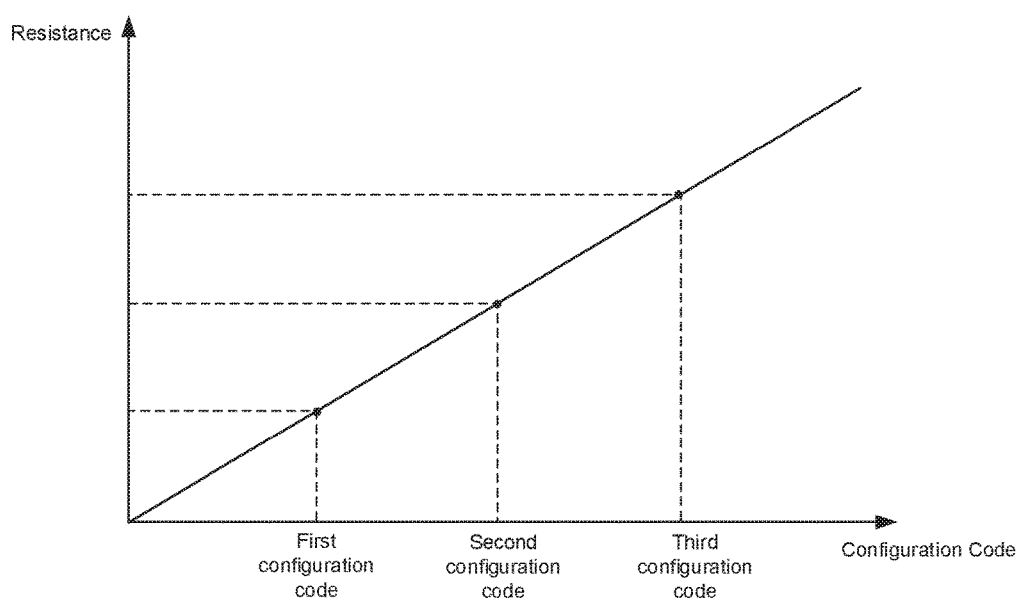

FIG. 14B illustrates another example in which four samples are used (including the reference sample). In this example, the available range of configuration codes (and resistance) is divided into three segments (e.g. a lower resistance segment, middle resistance segment, and high resistance segment) with a sample taken from the middle of each segment including samples taken using a first configuration code from the lower resistance segment, using a second configuration code from the middle resistance segment, and using a third configuration code from the high resistance segment. A configuration code that provides a resistance closest to the reference may be used to calculate a target configuration. It will be understood that the range may be divided into any number of segments in this way to ensure that a sample close to the reference resistance can be used. Thus, increased accuracy may be obtained by using a larger number of samples.

Figure 14C:
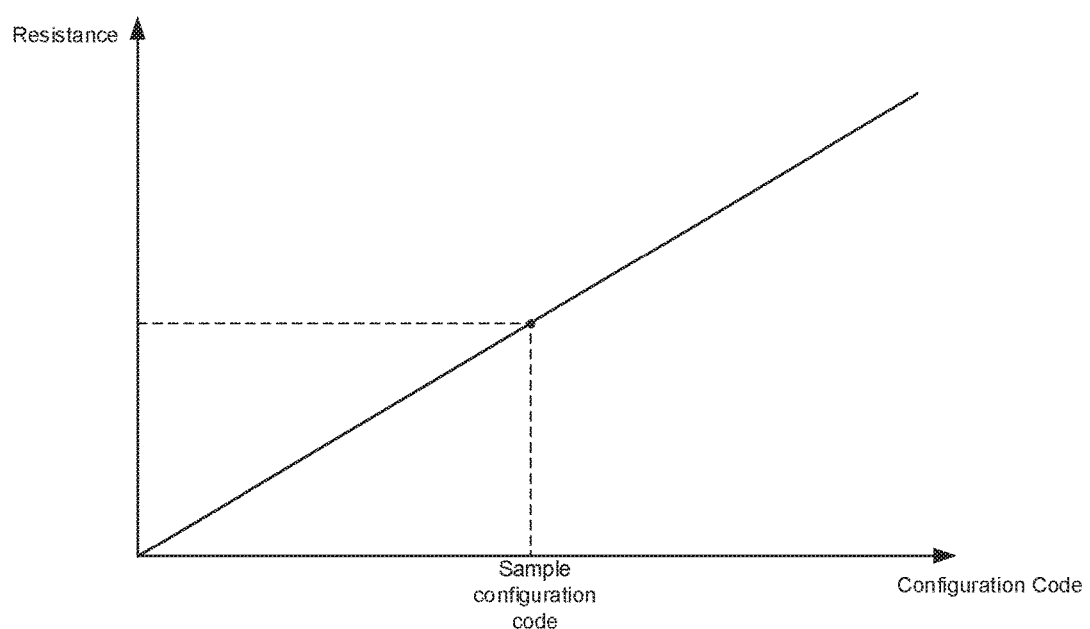

FIG. 14C illustrates another example in which just two samples are used (including the reference sample). In this example, a sample configuration code is chosen at the middle of the available range of configurations (and thus the middle of the range of resistances) and the voltage obtained from the configurable resistor with this configuration (e.g. configuration code mid_code in the middle of the range of configuration codes) is converted to a digital value. [ ] Vstep may be obtained from the ADC based on the step size and offset of the ADC (assuming the ADC is linear). For example, if the offset of the ADC is 0 volts and the step size of the ADC is ADCstep, then Vstep=ADCstep/(Rfix/Rlsb+mid_code) The difference between this digital value and the digital reference value is divided by Vstep to get an offset and this offset is applied to the sample configuration code to obtain the target configuration code.

While some applications of the present technology may be used during testing or initial configuration of an integrated circuit, in some cases, the present technology including techniques described above may be applied at one or more time after a product is initialized in one or more post-production reconfigurations. For example, a configurable resistor may be initially configured with a first configuration code to have a first configuration and a first resistance. It may later be reconfigured with a second configuration code to have a second configuration and a second resistance, or to return to its original resistance (and a third configuration, and so on). Thus, a configurable resistor may be reconfigured to adjust for wear or other effects. In some cases, configuration of a configurable resistor may be adjusted to compensate for temperature changes or other environmental or other effects.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An electrical circuit, comprising:
    a configurable resistor;
    a reference resistor;
    a current source circuit coupled to provide a current to the configurable resistor and the reference resistor;
    an Analog-to-Digital Converter (ADC) coupled to the configurable resistor and the reference resistor, the ADC configured to convert voltages from the configurable resistor and the reference resistor to digital values;
    a calculation circuit coupled to receive digital values from the ADC, the calculation circuit configured to calculate an adjustment for the configurable resistor from a digital reference value obtained from a reference resistor voltage and two or more digital values obtained from two or more voltages corresponding to two or more configurations of the configurable resistor; and
    a sequencer configured to adjust the configurable resistor based on the adjustment calculated by the calculation circuit.

2. The electrical circuit of claim 1 wherein the two or more digital values include a first digital value obtained from conversion of a first voltage from the configurable resistor in a first configuration, a second digital value obtained from conversion of a second voltage from the configurable resistor in a second configuration.

3. The electrical circuit of claim 2 wherein the configurable resistor is configurable to have a set of discrete resistance values configurable by a set of configuration codes, each discrete resistance value based on a corresponding configuration code, the first configuration corresponding to a first configuration code, the second configuration corresponding to a second configuration code, and a target configuration corresponding to a target configuration code, the calculation circuit configured to calculate the target configuration code for the configurable resistor and the sequencer configured to adjust the configurable resistor by sending the target configuration to the configurable resistor.

4. The electrical circuit of claim 3 wherein the set of discrete resistance values are stepped values with each discrete resistance value differing from adjacent discrete resistance values by a step and wherein the calculation circuit is configured to calculate a step voltage from a difference between the first digital value and the second digital value divided by a number of configurations between the first configuration and the second configuration.

5. The electrical circuit of claim 4 wherein the calculation circuit is configured to calculate a first difference between the first digital value and the digital reference value divided by the step voltage.

6. The electrical circuit of claim 5 wherein the calculation circuit is configured to calculate a second difference between the second digital value and the digital reference value divided by the step voltage and to select a smaller one of the first or second differences to obtain the target configuration code.

7. The electrical circuit of claim 1 wherein the current source circuit includes a current mirror, a first leg of the current mirror coupled to the reference resistor and a second leg of the current mirror coupled to the configurable resistor.

8. The electrical circuit of claim 7 wherein the current mirror includes a third leg coupled to a current output.

9. The electrical circuit of claim 8 further comprising a first switch between the first leg of the current mirror and the reference resistor, a second switch between the third leg and the current output, and a third switch between the first leg and the current output, configurable to connect the current output to either the first leg or the third leg of the current mirror.

10. The electrical circuit of claim 8 wherein the current source circuit further includes an operational amplifier having an output controlling the first leg, second leg, and third leg of the current mirror, an input of the operational amplifier coupled to the first leg and the second leg of the current mirror.

11. A method of calibrating a configurable resistor comprising:
generating a reference voltage from an electrical current applied to a reference resistor having a target resistance;
converting the reference voltage to a digital reference value;
generating a first voltage from the electrical current applied to the configurable resistor while the configurable resistor is in a first configuration generated by a first configuration code;
converting the first voltage to a first digital value;
generating a second voltage from the electrical current applied to the configurable resistor while the configurable resistor is in a second configuration generated by a second configuration code to generate a second voltage;
converting the second voltage to a second digital value;
calculating from the digital reference value, the first digital value, and the second digital value, a target configuration code corresponding to the target resistance; and
configuring the configurable resistor by providing the target configuration code to the configurable resistor.

12. The method of claim 11 wherein calculating the target configuration code includes calculating a step voltage, the step voltage calculated from a difference between the first digital value and the second digital value divided by a number of configurations from the first configuration to the second configuration.

13. The method of claim 12 wherein calculating the target configuration code includes calculating a difference between the first digital value and the digital reference value divided by the step voltage to obtain a first offset from the first configuration code.

14. The method of claim 13 wherein calculating the target configuration code further comprises calculating a difference between the second digital value and the digital reference value divided by the step voltage to obtain a second offset from the second configuration code, the target configuration code calculated from the smaller of the first offset from the first configuration code and the second offset from the second configuration code.

15. The method of claim 14 further comprising:
providing the electrical current to the configurable resistor while the configurable resistor is in an additional one or more configurations generated by an additional one or more configuration codes to generate an additional one or more voltages;
converting the additional one or more voltages to an additional one or more digital values;
calculating differences between the additional one or more digital values and the digital reference value divided by the step voltage to obtain an additional one or more offsets from the additional one or more configuration codes; and
calculating the target configuration code using the smaller of the first offset from the first configuration code, the second offset from the second configuration code, and the additional one or more offsets from the additional one or more configuration codes.

16. The method of claim 11 wherein providing the electrical current to the reference resistor and providing the electrical current to the configurable resistor includes configuring a current mirror to mirror the electrical current to the reference resistor and the configurable resistor, and further includes mirroring the electrical current to a current output.

17. The method of claim 11 wherein the digital reference value, the first digital value, and the second digital value are obtained in a predetermined sequence and calculating the target configuration code occurs after completion of the predetermined sequence.

18. A resistance calibration circuit, comprising:
a configurable resistor configurable by a digital configuration code to have a configuration from a set of configurations corresponding to a set of stepped resistance values;
a reference resistor of a predetermined resistance;
a current mirror coupled to provide a mirrored current to a first terminal of the configurable resistor and to a first terminal of the reference resistor, a second terminal of the configurable resistor and a second terminal of the reference resistor connected to ground;
an Analog-to-Digital Converter (ADC) coupled to the configurable resistor and the reference resistor, the ADC configured to convert a first voltage from the first terminal of the configurable resistor in a first configuration to a first digital value, convert a second voltage from the first terminal of the configurable resistor in a second configuration to a second digital value, and convert a voltage at the first terminal of the reference resistor to a digital reference value;
a calculation circuit configured to calculate a difference between the first digital value and the second digital value divided by a number of configurations from the first configuration to the second configuration to obtain a step voltage, divide the difference between at least one of the first or second digital values and the digital reference value by the step voltage to obtain an offset, and generate a target code by applying the offset to the first or second digital value; and
a sequencer to configure the configurable resistor according to the target code to have a resistance corresponding to the predetermined resistance.

19. The resistance calibration circuit of claim 18 further comprising a plurality of switches and wherein the sequencer is further coupled to control the plurality of switches to configure the current mirror in a plurality of configurations including at least a calibration configuration and an operational configuration.

20. The resistance calibration circuit of claim 18 wherein the digital configuration code is an n digit code, the configurable resistor has a configuration range that includes $2^n$ configurations, and the first configuration and second configuration are equally spaced from a mid-point of the configuration range at $2^n/4$ above and below the mid-point of the configuration range respectively.

\* \* \* \* \*